(12) United States Patent
Aoki et al.

(10) Patent No.: US 6,168,524 B1
(45) Date of Patent: Jan. 2, 2001

(54) ENHANCEMENTS IN THE SENSE OF SURPRISE IN A RPG

(75) Inventors: Kazuhiko Aoki; Keizo Kokubo, both of Tokyo (JP)

(73) Assignee: Square Co., Ltd., Tokyo (JP)

( * ) Notice: Under 35 U.S.C. 154(b), the term of this patent shall be extended for 0 days.

(21) Appl. No.: 09/161,647

(22) Filed: Sep. 28, 1998

Related U.S. Application Data

(62) Division of application No. 08/536,735, filed on Sep. 29, 1995, now Pat. No. 5,890,964.

(30) Foreign Application Priority Data

Oct. 13, 1994 (JP) .................................................. 6-273085

(51) Int. Cl.[7] ...................................................... A63F 9/24
(52) U.S. Cl. ............................... 463/31; 463/44; 463/42; 273/148.13
(58) Field of Search ................................ 403/16, 17, 18, 403/19, 20, 21, 25, 40, 41, 42; 705/4; 463/23, 24, 43, 44, 7, 9, 42

(56) References Cited

U.S. PATENT DOCUMENTS

| | | | |
|---|---|---|---|
| 4,580,782 | * | 4/1986 | Ochi ........................................ 463/31 |
| 4,672,541 | * | 6/1987 | Bromley et al. ........................ 463/31 |
| 4,738,451 | * | 4/1988 | Logg ......................................... 463/2 |
| 4,905,147 | | 2/1990 | Logg . |
| 5,358,259 | * | 10/1994 | Best ...................................... 463/31 |
| 5,377,997 | * | 1/1995 | Wilden et al. ........................ 463/43 |
| 5,395,112 | | 3/1995 | Darling . |
| 5,405,151 | * | 4/1995 | Naka et al. ............................ 463/31 |
| 5,498,002 | * | 3/1996 | Gechter ................................. 463/31 |
| 5,553,864 | * | 9/1996 | Sitrick ................................... 463/31 |
| 5,816,920 | * | 10/1998 | Hanai .................................... 463/42 |

FOREIGN PATENT DOCUMENTS 2 163 929 * 3/1986 (GB) ..................................... 273/55

OTHER PUBLICATIONS

Declaration of Examiner James Schaaf in support of a Robot Computer Game, Apr. 1999.*

Dewdney, Computer Recreations, Scientific American, May 1984, pp. 14–22.*

* cited by examiner

Primary Examiner—Michael O'Neill
(74) Attorney, Agent, or Firm—McDermott, Will & Emery

(57) ABSTRACT

Each character that makes an appearance in a game is provided with a program, which is independent of other programs, for deciding the action of the character, and with a program counter. These mutually independent programs are run in parallel. The speed at which the program advances differs for each character. A character representing the player is endowed with the highest speed of advance, and this character is given the highest priority in parallel processing as well. Interaction among characters is realized by communication among the programs, and an order of priority is assigned to communication among programs. As a result, the game is provided with a greater sense of surprise and the program game is easier to create.

12 Claims, 28 Drawing Sheets

Fig. 10

```
 1: ;    ==== PROGRAM CODE 1 ====
 2: [Hero]                              ; CHARACTER MOVED BY PLAYER
 3:     think $00                       ; THINKING TIME (THE SMALLER THE
                                           NUMERICAL VALUE, THE QUICKER
                                           THE ACTION)
 4:     ret                             ; END INITIAL SETTING
 5:     everpc                          ; ORDINARY ACTION IS CONTROLLED
                                           BY PLAYER
 6:
 7: *Frog companion                     ; WALK ALONG WITH FROG
 8:     req 5 Frog identical action     ; REQUEST EXECUTION OF "*identical
                                           action" IN "Frog" PROGRAM AT
 9:                                     ;   ORDER OF PRIORITY 5
10:     ret                             ; END "*Frog companion"
11:
12: *Robo companion                     ;
13:     req 5 Robo identical action     ; REQUEST EXECUTION OF "*identical
                                           action" IN "Robo" PROGRAM AT
14:                                     ;   ORDER OF PRIORITY 5
15:     ret                             ; END "*Robo companion"
16:
17:     ---------------------
              .
              .
              .
```

Fig.11

```
1: ;    ==== PROGRAM CODE 2====
2: [Frog]                            ; PROGRAM WHICH MOVES FROG
3: !   invited                       ; FLAG THAT IS RAISED WHEN
                                       INVITED BY HERO
4:     think $08                     ; THINKING TIME
5:     char $01                      ; DESIGNATE TYPE OF DISPLAYED
                                       CHARACTER
6:     xy $1a $14                    ; SET COORDINATES AT WHICH FROG
                                       MAKES APPEARANCE
7:     ret                           ; END INITIAL SETTING
8:     animeset $01                  ; DESIGNATE ANIMATION (WALKING
                                       PATTERN)
9:     mspeed $20                    ; DESIGNATE TRAVELING SPEED
                                       (WALKING SPEED)
10:    backhere                      ; BEGINNING OF LOOP
11:        move $1e $14              ; ORDINARY ACTION IS BACK-AND
12:        turn $00                  ;   -FORTH MOTION BETWEEN
13:        wait $10                  ;   COORDINATES ($1a, $14) AND
14:        move $1a $14              ;   ($1e, $14) (FROG IS WAITING
15:        turn $01                  ;   FOR MARU)
16:        wait $10                  ;
17:    back                          ; RETURN TO backhere
18:
19:*TALK                             ; WHEN SPOKEN BY HERO
20:    if Maru has arrived = $00     ; IF MARU HAS NOT ARRIVED
21:        tura Hero                 ; FACE TOWARD HERO
22:        mes asondemoii_1          ; READ OUT AND DISPLAY MESSAGE
                                       FROM "asondemoii_1" OF
23:                                  ;   MESSAGE FILE
24:        set invited $01           ; RAISE "invited" FLAG
25:        inc attribute             ; INCREMENT ATTRIBUTE
26:        req1 Hero Frog companion  ; REQUEST EXECUTION OF "*Frog
                                       companion" IN "Hero" PROGRAM
27:                                  ;   AT ORDER OF PRIORITY 1
28:    else                          ; IF MARU HAS ARRIVED
29:        tura Hero                 ; FACE TOWARD HERO
30:        mes gomen_1               ; DISPLAY MESSAGE
```

Fig. 12

```
31:     endif
32:     ret                         ; END "*TALK"
33:
34: *reply
35:     tura Maru                   ; FACE TOWARD MARU
36:     mes zenzen                  ; DISPLAY MESSAGE
37:     animeset $06                ; DESIGNATE ANIMATION (RUNNING
                                      PATTERN)
38:     mspeed $40                  ; DESIGNATE TRAVELING SPEED
                                      (RUNNING SPEED)
39:     if invited = $01            ; REFUSE HERO IF HAVING BEEN
                                      INVITED BY HERO
40:        mova Hero                ; MOVE TO SIDE OF HERO
41:        mes gomen_2              ; DISPLAY MESSAGE
42:        dec attribute            ; DECREMENT ATTRIBUTE
43:     endif                       ; GO ON DATE IF NOT INVITED
44:     move $00 $00                ; MOVE TO EDGE OF MAP
45:     everstay                    ; LEAVE
46:     ret                         ; END "*reply"
47:
48: *identical action
49:     mspeed $20                  ; DESIGNATE TRAVELING SPEED (LOW
                                      SPEED)
50:     everchase Hero              ; FOLLOW AFTER HERO
51:     ret                         ; END "*identical action"
52:
53:     ------------------------
            .
            .
            .
```

Fig. 13

```
1: ;      ==== PROGRAM CODE 3 ====            ;
2: [Maru]                                      ; PROGRAM WHICH MOVES MARU
3: !    Maru has arrived                       ; FLAG THAT IS RAISED WHEN MARU
                                                 ARRIVES
4:      think $15                              ; THINKING TIME
5:      char $02                               ; DESIGNATE TYPE OF DISPLAYED
                                                 CHARACTER
6:      xy $0c $10                             ; SET COORDINATES AT WHICH MARU
                                                 MAKES APPEARANCE
7:      ret                                    ; END INITIAL SETTING
8:      backhere                               ; BEGINNING OF LOOP
9:      if time > 1                            ; IF TIME IN TIMER PASSES 1
10:         animeset $06                       ; DESIGNATE ANIMATION (RUNNING
                                                 PATTERN)
11:         mspeed $40                         ; DESIGNATE TRAVELING SPEED
                                                 (RUNNING SPEED)
12:         move $1a $14                       ; MOVE TO PLACE WHERE FROG IS
                                                 WAITING
13:         animeset $00                       ; DESIGNATE ANIMATION
                                                 (STATIONARY PATTERN)
14:         set Maru has arrived $01           ; SET "Maru has arrived" FLAG
15:         mes mattaa                         ; DISPLAY MESSAGE
16:         req 1 Frog reply                   ; REQUEST EXECUTION OF "*reply" IN
                                                   "Frog" PROGRAM AT ORDER OF
17:                                            ;   PRIORITY 1
18:         animeset $06                       ; DESIGNATE ANIMATION (RUNNING
                                                 PATTERN)
19          everchase Frog                     ; FOLLOW AFTER FROG
20:     else                                   ; BEFORE TIME 1 ELAPSES
21:         stay                               ; STAY AS IS
22:     endif
23:     back                                   ; RETURN TO backhere
24:
25:     ------------------------
            .
            .
            .
```

Fig. 14

```
1: ;     ==== PROGRAM CODE 4 ====
2: [Robo]                              ; PROGRAM WHICH MOVES ROBO
3: !    invited                        ; FLAG THAT IS RAISED WHEN
                                         INVITED BY HERO
4:      think $05                      ; THINKING TIME
5:      char $03                       ; DESIGNATE TYPE OF DISPLAYED
                                         CHARACTER
6:      xy $14 $18                     ; DESIGNATE COORDINATES AT WHICH
                                         ROBO MAKES APPEARANCE
7:      ret                            ; END INITIAL SETTING
8:      animeset $06                   ; DESIGNATE ANIMATION (RUNNING
                                         PATTERN)
9:      mspeed $40                     ; DESIGNATE TRAVELING SPEED
                                         (RUNNING SPEED)
10:     backhere                       ; BEGINNING OF LOOP
11:        move $18 $17                ;
12:        wait $10                    ;
13:        move $18 $1d                ;
14:        wait $10                    ; ORDINARY ACTION IS JOGGING
15:        move $14 $1e                ;
16:        wait $10                    ;
17:        move $14 $19                ;
18:        wait $10                    ;
19:     back                           ; RETURN TO backhere
20:
21:*TALK                               ; WHEN SPOKEN BY HERO
22:     if time >2                     ; END JOGGING IF TIME 2 ELAPSES
23:        tura Hero                   ; FACE TOWARD HERO
24:        mes assondemoii_2           ; DISPLAY MESSAGE
25:        set invited $01             ; RAISE "invited" FLAG
26:        inc attribute               ; INCREMENT ATTRIBUTE
27:        req 1 Hero Robo companion   ; REQUEST EXECUTION OF "*Robo
                                         companion" IN "Hero" PROGRAM
28:                                    ;   AT ORDER OF PRIORITY 1
29:     else                           ; IF TIME 2 DOES NOT ELAPSE
30:        tura Hero                   ; FACE TOWARD HERO
```

Fig. 15

| | | |
|---|---|---|
| 31: | mes dietchuu | ; DISPLAY MESSAGE |
| 32: | endif | |
| 33: | ret | ; END "*TALK" |
| 34: | | |
| 35: | *reply | |
| 36: | tura Eira | ; FACE TOWARD EIRA |
| 37: | mes gomen_3 | ; DISPLAY MESSAGE |
| 38: | animeset $06 | ; DESIGNATE ANIMATION (RUNNING PATTERN) |
| 39: | mspeed $40 | ; DESIGNATE TRAVELING SPEED (RUNNING SPEED) |
| 40: | if invited = $01 | ; REFUSE HERO IF HAVING BEEN INVITED BY HERO |
| 41: | mova Hero | ; MOVE TO SIDE OF HERO |
| 42: | mes gomen_4 | ; DISPLAY MESSAGE |
| 43: | dec attribute | ; DECREMENT ATTRIBUTE |
| 44: | endif | ; REMAIN OFF SCREEN IF NOT INVITED |
| 45: | move $00 $00 | ; MOVE TO EDGE OF MAP |
| 46: | everstay | ; LEAVE |
| 47: | ret | ; END "*Reply" |
| 48: | | |
| 49: | *identical action | |
| 50: | mspeed $20 | ; DESIGNATE TRAVELING SPEED (LOW SPEED) |
| 51: | everchase Hero | ; FOLLOW AFTER HERO |
| 52: | ret | ; END "*identical action" |
| 53: | | |
| 54: | ---------------------- | |

```
1: ;     ==== PROGRAM CODE 5 ====
2: [Eira]                                ; PROGRAM WHICH MOVES EIRA
3: !    Eira has arrived                 ; FLAG THAT IS RAISED WHEN EIRA
                                           ARRIVES AT LOCATION OF ROBO
4:      think $10                        ; THINKING TIME
5:      char $04                         ; DESIGNATE TYPE OF DISPLAYED
                                           CHARACTER
6:      xy $26 $1a                       ; SET COORDINATES AT WHICH EIRA
                                           MAKES APPEARANCE
7:      ret                              ; END INITIAL SETTING
8:      backhere                         ; BEGINNING OF LOOP
9:      if time >3                       ; IF TIME 3 ELAPSES
10:         animeset $06                 ; DESIGNATE ANIMATION (RUNNING
                                           PATTERN)
11:         mspeed $40                   ; DESIGNATE TRAVELING SPEED
                                           (RUNNING SPEED)
12:         mova Robo                    ; MOVE TO SIDE OF ROBO
13:         animeset $00                 ; DESIGNATE ANIMATION
                                           (STATIONARY PATTERN)
14:         set Eira has arrived $01     ; SET "Eira has arrived" FLAG
15:         mes omaeha                   ; DISPLAY MESSAGE
16:         req 1 Robo reply             ; REQUEST EXECUTION OF "*reply" IN
                                             "Robo" PROGRAM AT ORDER OF
17:                                      ;    PRIORITY 1
18:         animeset $06                 ; DESIGNATE ANIMATION (RUNNING
                                           PATTERN)
19:         mspeed $38                   ; DESIGNATE TRAVELING SPEED
20:         everchase Robo               ; CHASE ROBO
21:     else                             ; BEFORE TIME 3 ELAPSES
22:         stay                         ; STAY AS IS
23:     endif
24:     back                             ; RETURN TO backhere
25:
26:     ------------------------
         .
         .
         .
```

Fig. 17

```
1: ;      ==== PROGRAM CODE 6 ====
2: [Timer]                              ; TIME KEEPING (REFERENCE IS MADE
                                          WITHIN PROGRAM)
3:     think $60                        ; THINKING TIME (THE SMALLER THE
                                          NUMERICAL VALUE, THE QUICKER
                                          THE ACTION)
4:     ret                              ; END INITIAL SETTING
5:     backhere                         ; BEGINNING OF LOOP
6:         if counter > 60              ; AT 60 SECONDS
7:             inc time                 ; INCREMENT TIME BY 1
8:             set counter $00          ; SET $00 IN COUNTER
9:         else
10:            inc counter              ; INCREMENT COUNTER
11:        endif
12:    back                             ; RETURN TO backhere
13:
14: ----------------------
             .
             .
             .
```

Fig. 18

```
 1: ;      ====MESSAGE FILE ====
 2: asondemoii_1:
 3:     FROG:   I've been waiting but she hasn't arrived.   So we may
 4:                as well go and play together.
 5: gomen_1:
 6:     FROG:   Sorry.   The two of us will go on a date together today.
 7: zenzen:
 8:     FROG:   I haven't been waiting long at all.
 9: gomen_2:
10:     FROG:   Sorry.   Let's make it next time.
11: mattaa:
12:     MARU:   Sorry to be late.   You've been waiting a long time,
                haven't you?
13: asondemoii_2:
14:     ROBO:   What?   Go and play?   Let's go!   Let's go!
15: dietchuu:
16:     ROBO:   I'm jogging in order to diet so invite me again
17:                a little later.
18: gomen_3:
19:     ROBO:   Oh!   I'm sorry
20: gomen_4:
21:     ROBO:   Sorry.   Please make it next time.
22: omaeha:
23:     EIRA:   You still haven't paid back the money I lent you!!
24:
25:         -----------------------
                    .
                    .
                    .
```

US 6,168,524 B1

ENHANCEMENTS IN THE SENSE OF SURPRISE IN A RPG

This application is a divisional of application Ser. No. 08/536,735 filed Sep. 29, 1995, now U.S. Pat. No. 5,890,964, issued on Apr. 6, 1999.

BACKGROUND OF THE INVENTION

1. Field of the Invention

This invention relates to a video game system for implementing a role-playing game (RPG) in which a player character standing in for the player aims at achieving a certain goal in terms of a story on a video screen, wherein the game is made to proceed by manipulating the character displayed on the screen. The invention further relates to a method of controlling the system and to a memory cartridge for the video game.

2. Description of the Related Art

In a role-playing game, the player aims at achieving a certain goal in a story (searching for a sweetheart who has gone missing because of an accident, searching for a companion who will cooperate with the player, rescuing a city dweller from a disaster, etc.), and the player plays the game by manipulating the player character displayed on the screen.

A role-playing game is characterized in that greater emphasis is placed upon the story than is the case with games of other genre, and that the player plays the role of the hero or heroine (or heroes or heroines) in the story. A background screen of the kind which visually expresses a mythical world is displayed. In the latest examples of such role-playing games, mountains, cities and buildings are displayed, as well as city dwellers walking among them. Besides the player character, a plurality of other characters who become the friend or enemy of the player character appear.

Another characterizing feature of a role-playing game is that the internal data relating to the hero whose role is played by the player has a growth element. The player plays the game by freely making a variety of choices, such as conversing with people, buying and using objects, fighting with an enemy, etc. The choices made are evaluated and the data is internally modified accordingly (mainly in a direction that tends to advance the game).

In a conventional role-playing game, the conduct of the player character is controlled and evaluated by a single predetermined program. These leads to the following problems:

First, the story lacks a sense of surprise. Specifically, while the player is moving the player character, which is the player's own character, the other characters are at rest on the screen or merely perform fixed actions (such as moving back and forth) in accordance with a simple display processing routine or actions that are based upon random numbers.

Second, the program is made complicated by a diversity of conditional branch statements. When, in order to provide a story with a greater sense of surprise, it is attempted to cause the other characters to perform meaningful actions while the player character is being moved, a variety of conditional branch statements (e.g., an "if~else" statement or "switch~case~case" statement in C language) must be used in the program (an account of all possible cases must be described in the program). This results in a complex game program.

SUMMARY OF THE INVENTION

An object of the present invention is to arrange it so that a plurality of characters, inclusive of the player character, that appear on a screen can be moved independently of one another thereby making it possible to enjoy a more realistic game, without significantly complicating the program.

Another of the present invention is to arrange it so that a plurality of characters interact with and influence one another, thereby making it possible to enhance the sense of surprise.

According to the present invention, the foregoing objects are attained by providing a video game apparatus for displaying a plurality of characters, inclusive of a player character, on a display screen of a display device and controlling the actions of the characters in response to a signal from an input operation unit, comprising program storage means for storing codes of a plurality of mutually independent program statements created with regard to respective ones of the plurality of characters and describing commands relating to actions of the characters, a plurality of program counters for storing, with regard to respective ones of the plurality of programs, a position of a program statement to be executed with regard to each character, and program control means for performing control so as to read, and execute, one or a plurality of statements, designated by corresponding ones of the program counters of the programs of the characters, out of the program storage means in regular order, and, at execution of a process, incrementing the corresponding program counter.

Further, according to the present invention, the foregoing objects are attained by providing a method of controlling a video game system for displaying a plurality of characters, inclusive of a player character, on a display screen of a display device and controlling the actions of the characters in response to a signal from an input operation unit, comprising the steps of previously creating and storing, in a memory device, a plurality of mutually independent programs, which describe commands relating to actions of the characters, with regard to respective ones of a plurality of programs, providing a plurality of program counters for storing, with regard to respective ones of the plurality of programs, a position of a program to be executed with regard to each character, and reading one or a plurality of consecutive program statements, designated by the corresponding program counters of the programs of the characters, out of the memory device in regular order, executing the program statements and, at execution of a process, incrementing the corresponding program counter.

In accordance with this invention, each of a plurality of characters that appear on a display screen acts in accordance with an independent program. This means that it is possible to make the characters perform independent actions simultaneously and to cause other characters to act independently while the player character is moving. This provides for greater game diversity. Moreover, it is not necessarily required to use many conditional branch statements that hypothesize all possible cases.

Since characters act in accordance with their own independent programs, record data indicative of the behavior of each character can be obtained in a time and space specific to the character (namely along the character's own time axis and in relation to the character's own circumstances and environment). As a result, a character can be evaluated independently and in real time. A change in the nature and attributes of a character can also be performed character by character.

A window which displays text such as the message of a character can also be defined for each character. As a result, the window can be scrolled independently of the actions of the other characters and a window display can be presented for each of the plurality of characters.

It is preferred that the program execution speed be decided for each character. The cycle of execution of the character program is changed in accordance with this decision.

For example, such processing can be implemented by incorporating a code representing the program execution speed in the program of each character.

Further, by way of example, it will suffice to adopt an arrangement in which whether a program is to be executed or not is decided with regard to each character at each cycle of execution, and execute the program only with regard to a character for which execution has been decided.

Such control makes it possible to set fast- and slow-acting characters so that an interesting game will develop. For example, an arrangement can be adopted in which the player character is allow to be moved rapidly preferentially with respect to the other characters.

Furthermore, an arrangement can be adopted in which the order of characters whose programs are to be executed is decided and the execution sequence of the character programs is changed in accordance with this decision.

By arranging it so that characters acting independently of one another communicate with one another, the development of the game is made more interesting and greater surprise through the interaction of the characters.

This can be achieved by incorporating a communication request statement, which contains a request and the other party to communication, in the program of at least one character, and, when the communication request statement has been read out, changing the value of the program counter corresponding to the starting position of the corresponding program statement in the program of the character that is the other party designated by this communication request statement.

A game which develops more realistically and more interestingly can be achieved by assigning an order of priority to the communication among characters.

In order to realize this, data representing order of priority is incorporated in the communication request statement and order of priority is determined in advance with regard to processing other than processing that is in response to the communication request statement. The order of priority of processing currently being executed is stored for each and every program, the order of priority of the communication request and the order of priority of the program currently being executed are compared when the communication request is issued, a count having the lower order of priority and the order of priority are saved in a memory area, the count having the higher order of priority is set in a program counter and the order of priority thereof is stored.

The present invention further provides a memory cartridge or storage medium or storage device storing a program which finds use in implementing the above-described video game system or which is for implementing the above-described control method.

By inserting the memory cartridge or storage medium or storage device into a video game system which includes a computer system and loading the program that has been stored in the cartridge or medium or device, the game can be enjoyed employing a variety of media using a video game system (a family computer) or a general-purpose computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 illustrates an example of a program relating to a Character 1 (the hero);

FIGS. 11 and 12 illustrate an example of a program relating to a Character 2 ("Frog");

FIG. 13 illustrates an example of a program relating to a Character 3 ("Maru");

FIGS. 14 and 15 illustrate an example of a program relating to a Character 4 ("Robo");

FIG. 16 illustrates an example of a program relating to a Character 5 ("Eira");

FIG. 17 illustrates an example of a program relating to a Character 6 (a timer);

FIG. 18 shows an example of a message file;

DESCRIPTION OF THE PREFERRED EMBODIMENT

Figure 1:
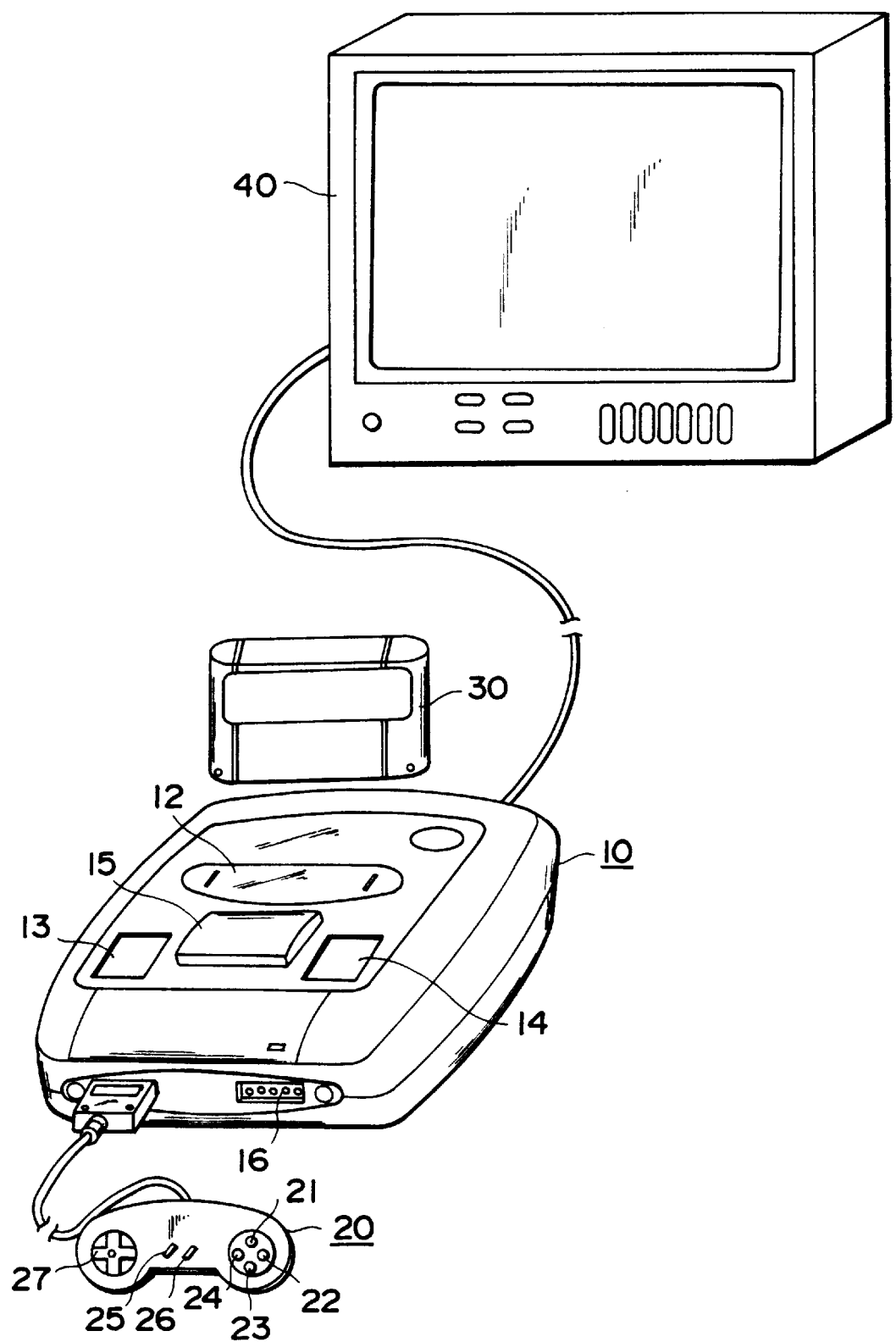
FIG. 1 is a perspective view showing the entirety of a video game system.

FIG. 1 illustrates the overall view of the video game system.

This system includes a game processor (game machine) 10 referred to as a so-called "super family computer", a controller 20 serving as an input unit or controller detachably connected to the game processor 10, a memory cartridge (or memory cassette) 30 free to be loaded in or unloaded from the game processor 10, and a display unit (e.g., a television receiver or monitor display device) 40, to which the game processor 10 is detachably connected, for providing a video screen for a video game.

The game processor 10 has an insertion port 12, which is provided in the top of the processor at the central portion thereof, into which the memory cartridge 30 is detachably loaded. Provided in the interior of the insertion port 12 is a connector 56 (see FIG. 2) to which pins, conductive patterns or electrodes of the memory cartridge 30 are connected. A power switch 13, a reset switch 14 and an eject button 15 for ejecting the memory cartridge 30 are provided in front of the insertion port 12. The front side of the game processor 10 is provided with connectors 16 (so that two controllers 20 can be connected) to each of which the controller 20 is freely connected and disconnected.

The controller 20 is provided with an A button 21 for decision making, a B button 22 for canceling, an X button 23 for selecting a menu display, a Y button 24, a start button 25, a select button 26, a joy pad 27 for moving a cursor and a player character vertically and horizontally on the display screen, and various other buttons (not shown). In this embodiment, the A button 21 and joy pad 27 are mainly used in order to perform various input operations.

Figure 2:
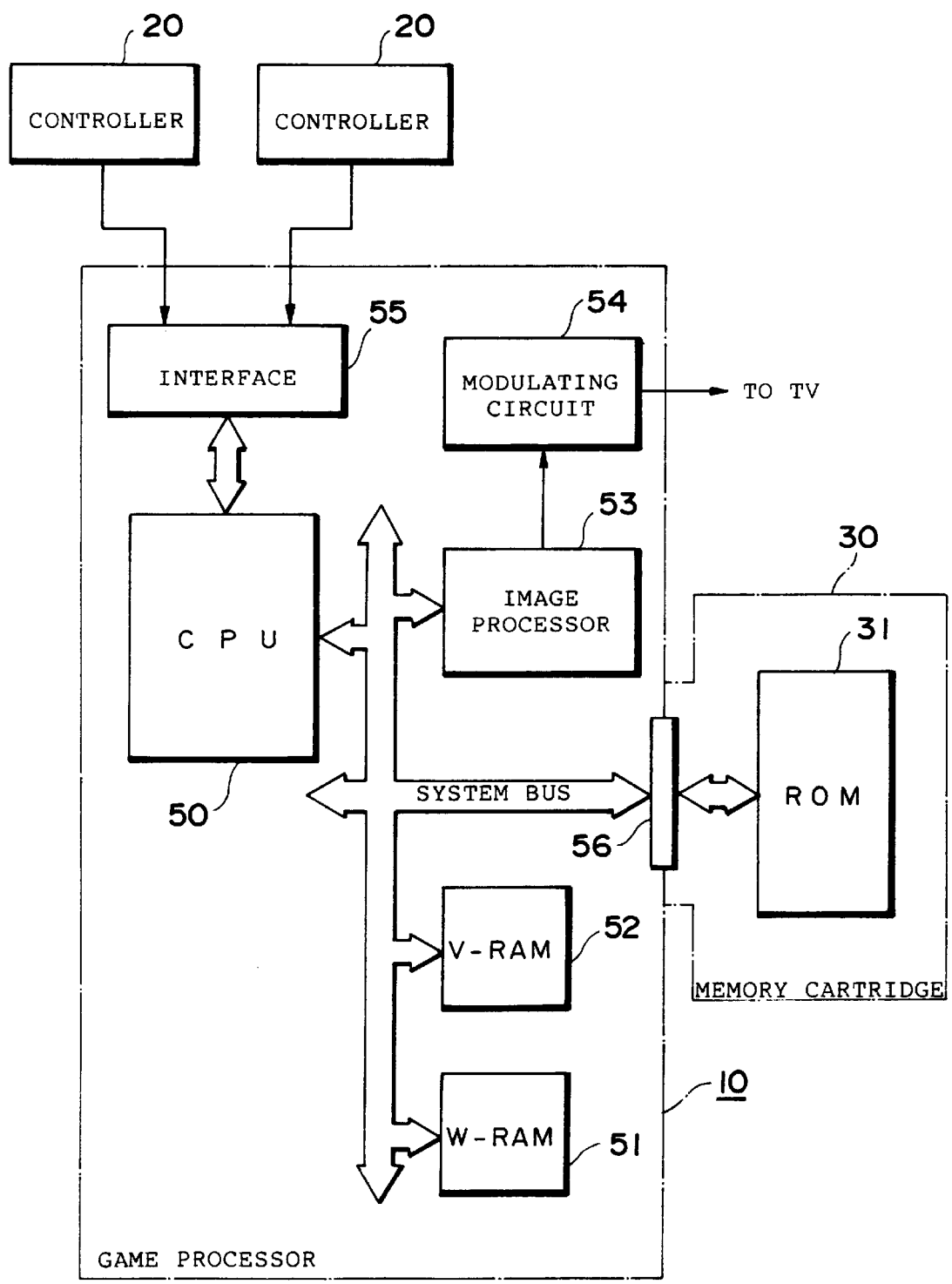
FIG. 2 is a block diagram showing the electrical configuration of the video game apparatus.

FIG. 2 mainly illustrates the general features of the electrical configuration of the game processor 10.

The game processor 10 includes a CPU (central processing unit) 50, which controls the overall operation of the video game. The execution program of the CPU 50 is stored beforehand in a ROM 31 incorporated within the memory cartridge 30. Data representing an image displayed on the display unit 40 is also stored in the ROM 31. The ROM 31 is connected to the CPU 50 by a system bus (inclusive of a data bus, address bus and control lines) via the connector 56 when the memory cartridge 30 is connected to the game processor 10.

Also connected to the CPU 50 in the game processor 10 via the system bus is a working RAM 51 for loading the game program stored in the ROM 31 and storing various data as the game proceeds, as well as for use in data creation for execution of other processing, a video RAM 52 for storing image data read out of the ROM 31 in order to display the image, and for subjecting data to necessary processing, and an image processor 53 for creating a video signal for display purposes based upon the image data in the video RAM 52. The video signal produced by the image processor 53 is applied to the display unit 40 upon being converted to a signal suitable for supply to the display unit, such as an NTSC television signal, by a modulating circuit 54.

The controller 20 is connected to the game processor 10 and various signals from the controller 20 are entered into the CPU 50 via an interface 55. The player character ("Character 1" or the "hero" described later) which appears on the display screen of the display unit 40 acts in accordance with an action instruction provided by the player through the controller 20.

It goes without saying that the video game system can be realized not only by the family television game machine shown in FIGS. 1 and 2 but also by a personal computer. A personal computer possesses a CPU, memory devices (a ROM, RAM, hard disk drive, floppy disk drive, etc.), an image processor, an input unit (a keyboard, mouse, etc.) and an output unit (display unit, printer, etc.). In the case of the personal computer, the memory cartridge 30 storing the game program would be replaced by a floppy disk (or an optical disk) and the controller 20 would be replaced by the input unit.

Figure 3:
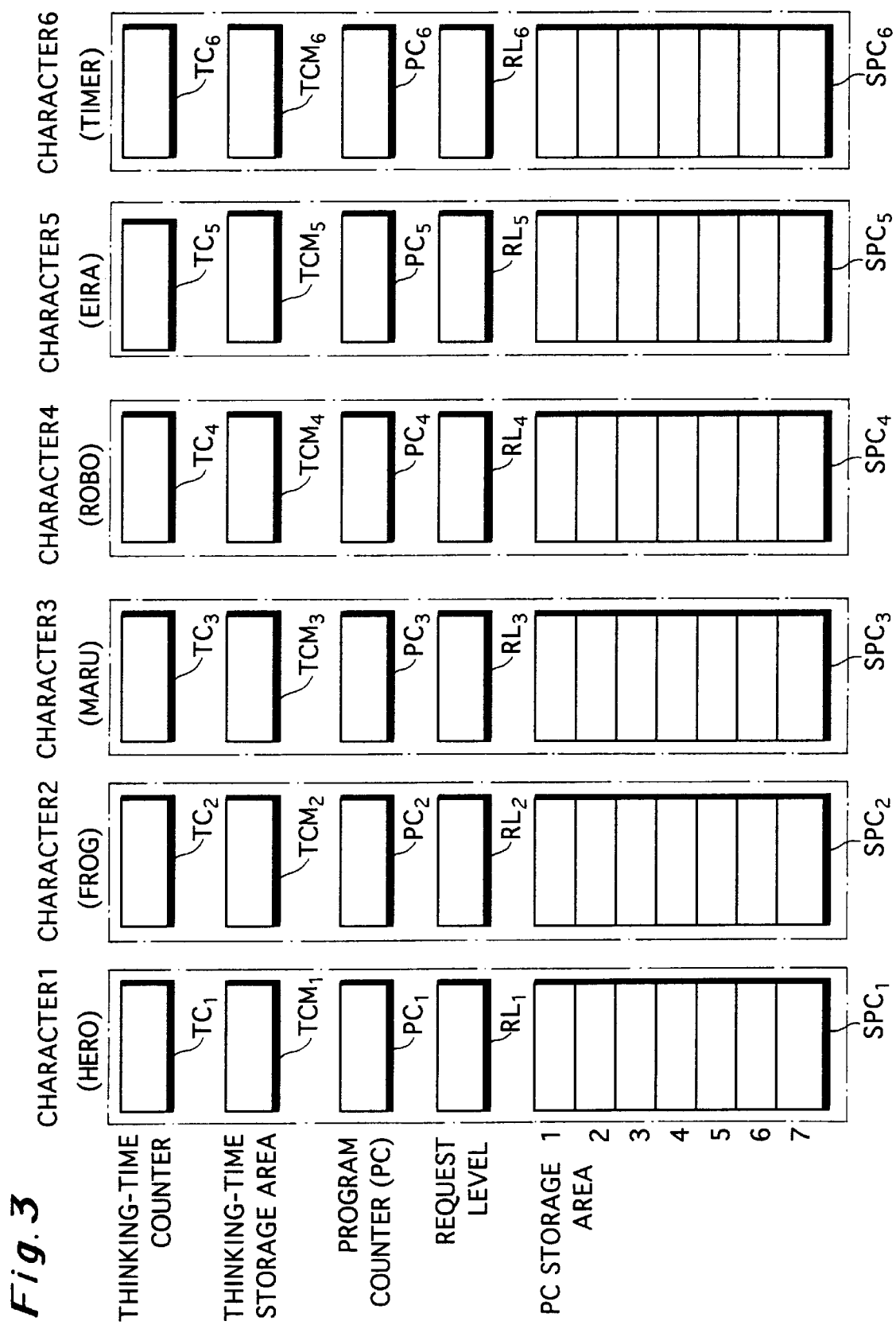
FIG. 3 illustrates a thinking-time counter, a thinking-time storage area, a program counter, a request-level storage area and a PC storage area, which are provided for each character.
Figure 4:
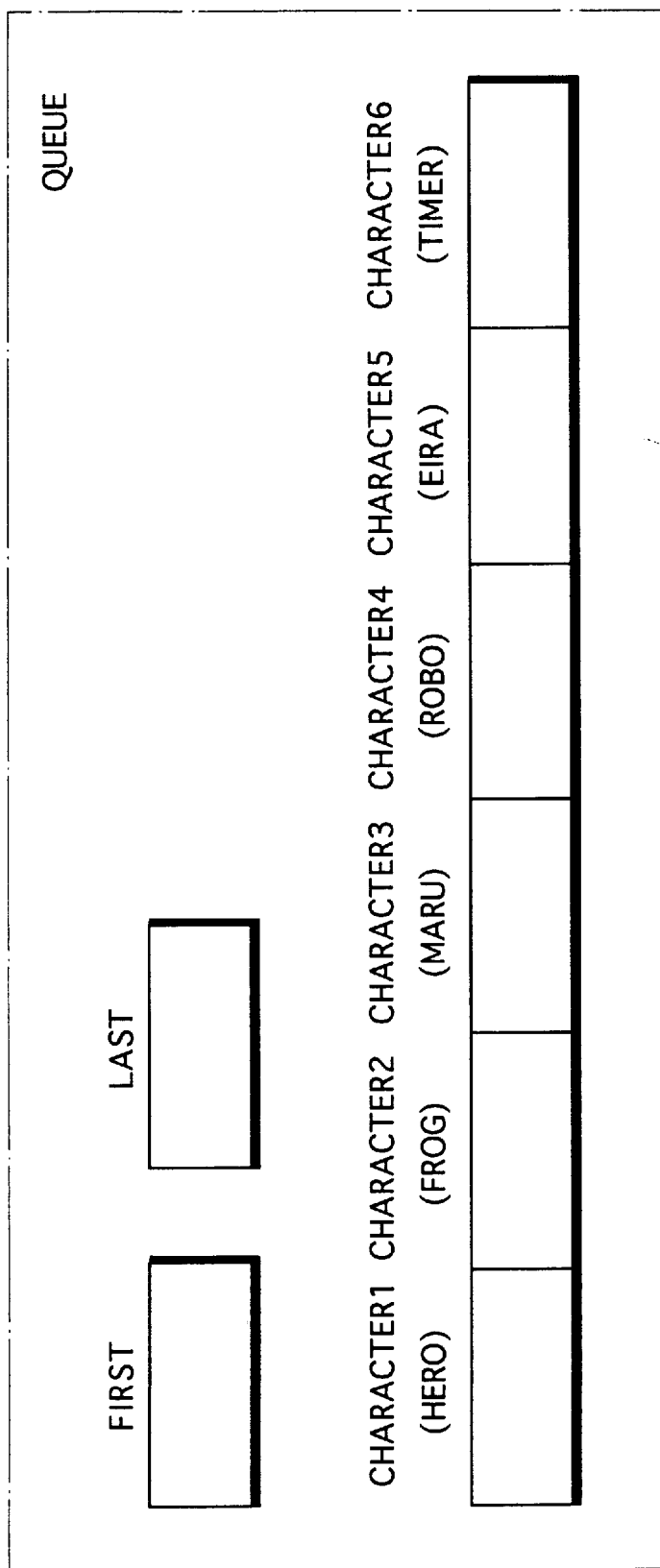
FIG. 4 illustrates a queue control block.

FIGS. 3 and 4 illustrate various areas set in the working RAM 51 of the game processor 10. These areas are set or created in accordance with the game program or data stored in the ROM 31 of the memory cartridge 30 at the start of the game, or are created by loading data that has been set in a RAM (not shown) in the memory cartridge 30.

A plurality of characters (or actors or actresses), inclusive of the hero, make appearances in the video game. In order to control and evaluate (change their attributes or nature) the actions of these characters, programs (program codes; PROGRAM CODES 1~6 described later) are created for respective ones of the characters. The programs of the respective characters are independent of one another.

In order to control the advance of these plural mutually independent programs, a thinking-time counter $TC_i$ (where i represents the character number, i is 1, 2, 3, . . . , n and n represents the total number of characters) for measuring the thinking time of the individual character, a thinking-time storage area $TCM_i$, a program counter $PC_i$, a request-level storage area $RL_i$ and a PC (program counter) storage area $SPC_i$ are provided for each program (each character).

In this embodiment, six characters (n=6) are provided. Character 1 is the hero (the player character). Characters 2~5 are the other actors (a human being, an animal, a robot, a monster, etc.). Natural objects and artificial objects (trees, playgrounds, treasure chests, doors, etc.) are also possible as characters. Character 6 is assigned to a timer that counts thinking time. The timer does not make an appearance on the screen of the video game. Thus, a program exists even for an entity that does not appear outwardly, and this program is treated in a manner equivalent to those of the other characters. (The program is incorporated in parallel processing, described later.) For the sake of convenience, therefore, the program is handled in a manner equivalent to that of a character.

The programs for controlling the plurality of characters are executed by time sharing (multiprogramming). In time sharing, a queue control block shown in FIG. 4 is provided in order to determine whether each program is to be executed or not and, if programs are to be executed, to control the order of execution.

The thinking-time counter $TC_i$ is for measuring thinking time (the speed at which the program code created for each character proceeds). The thinking time is given for each character by the program, and represents the alertness of the character. The shorter the thinking time, the more alert the character. The value recorded by the thinking-time counter $TC_i$ is decremented by one count every 1/60 of a second, as will be described later, and the corresponding character is registered in the queue control block when the value of the count becomes zero.

The thinking-time storage area $TCM_i$ is for storing the thinking time provided by the program. When the value of the thinking-time counter $TC_i$ becomes zero, the thinking time that has been stored in this storage area $TCM_i$ is preset in the thinking-time counter $TC_i$.

In initialization processing, a default value (a predetermined value) is set in the thinking-time storage area $TCM_i$ and then this default value is preset in the thinking-time counter $TC_i$.

The program counter $PC_i$ is for storing the memory address at which an execution code (command) of a program resides. The value of the count in the program counter $PC_i$ is incremented by one count whenever one byte of program code is read out. $PC_i$ is incremented by one count when a program code (one line) is constituted by one byte and by two counts when a program code is constituted by two bytes. For the sake of convenience and to facilitate understanding, it will be assumed in the following description that the program counter $PC_i$ indicates the line numbers of the program codes illustrated in FIGS. 10 through 17.

In order to produce interaction among the characters (i.e., in order to influence the next action of one character by the action of another character), mutual communication is carried out among the programs of the respective characters. Communication between programs is started by issuing a request to the program of one character from the program of another character. An order of priority is assigned to the communication request and is referred to a "request level". In this embodiment, orders of priority are provided in seven stages of from 1 to 7. Order of priority 1 is the highest priority.

The request-level storage area $RL_i$ stores the request level currently being executed. In the ordinary state of program execution (namely a state in which program execution is not based upon a communication request), the request level is set to the minimum level of 7.

The PC storage area $SPC_i$ has seven storage locations corresponding to the seven stages of order of priority. When there is a communication request from another program, whichever of the line number (the value in the program counter or a value obtained by adding 1 thereto) of the program routine currently being run or the line number at the beginning of the program routine to be run in response to the request has the lower order of priority is saved at the storage location of the corresponding order of priority.

When there is a request from another program, the order of priority of the routine currently being run (the level that has been stored in the request-level storage area $RL_i$) and the order of priority of the communication request are compared.

In a case where the order of priority of the communication request issued by the other program is higher than the order of priority of the routine currently being run (i.e., in a case where the value of the request level is small), the requested routine is executed preferentially. The line number (the value in the program counter $PC_i$) of the routine executed thus far is saved at the storage location of the order of priority of this routine in the PC storage area $SPC_i$. The line number at the beginning of the requested routine is set in the program counter $PC_i$ and the order of priority of the communication request is stored in the request-level storage area $RL_i$. When the processing of the requested routine ends, the value (line number) in the program counter saved in the PC storage area $SPC_i$ is set in the program counter $PC_i$ and the order of priority of the storage location saving this value of the program counter is set in the request-level storage area RLi. As a result, when there is a communication request having a high order of priority, the processing executed thus far is halted in response, the requested routine is run and the system then returns to the former processing.

In a case where the order of priority of the communication request is lower than that of the routine currently being run, the latter routine continues to be executed. Meanwhile, the line number at the beginning of the requested routine is saved at the storage location of the corresponding order of priority in the PC storage area $SPC_i$. At the moment the processing of the routine currently being executed ends, the value in the program counter $PC_i$ prevailing at this time is saved at the storage location of the corresponding order of priority in the PC storage area $SPC_i$, the line number of the requested routine saved in the PC storage area $SPC_i$ is read out, this line number is set in the program counter $PC_i$ and the corresponding order of priority is set in the request-level storage area $RL_i$.

When, at such time that the line number relating to the routine for which communication was requested has been stored in the PC storage area $SPC_i$, or at such time that the routine for which communication was requested is being executed, there is a further communication request from the program of another character, the order of priority of the program routine currently being run and the order of priority of this new communication request are compared and the line number of the routine having the lower order of priority is saved at the storage location of the corresponding order of priority in the PC storage area $SPC_i$ in the same manner as described above. Accordingly, two or more line numbers would be saved in the PC storage area $SPC_i$. When the routine currently being executed ends in such case, the routines are executed in order starting from the higher order of priority among the line numbers that have been stored in the PC storage area $SPC_i$.

In this system, the premise is that each program is created in such a manner that the order of priority of a routine for which communication has been requested and the order of priority of the routine currently being executed do not become equal. However, in a case where the orders of priority do become equal, it goes without saying that an arrangement may be adopted in which preference is given to either one.

As shown in FIG. 4, the queue control block is composed of a storage location "first" for storing the character (the character number or identification code thereof) to be executed first, a storage location "last" for storing the character to be executed last, and a plurality of storage locations corresponding to respective ones of the characters. The storage location corresponding to a given character stores the character that is to be executed following the program (one line of the program in principle) of the given character.

For example, assume that characters that have been registered in the queue control block are the first character (the hero), the second character (the frog), the fifth character (Eira) and the sixth character (the timer), and that the execution sequence of these characters is an order of the first, sixth, fifth and second characters. In such case, the first character (the hero) is stored at the storage location "first", the sixth character at the storage location of the first character, the fifth character at the storage location of the sixth character, the second character at the storage location of the fifth character and the second character also at the storage location "last". When execution of the program step regarding the first character at the lead ends, the order from the sixth character (which is to be executed second) onward is moved up by one. Accordingly, the sixth character would be stored in the storage location "first".

These storage locations are cleared (e.g., 80h is stored in them, where h is a hexadecimal number) in initialization processing.

Figure 5:
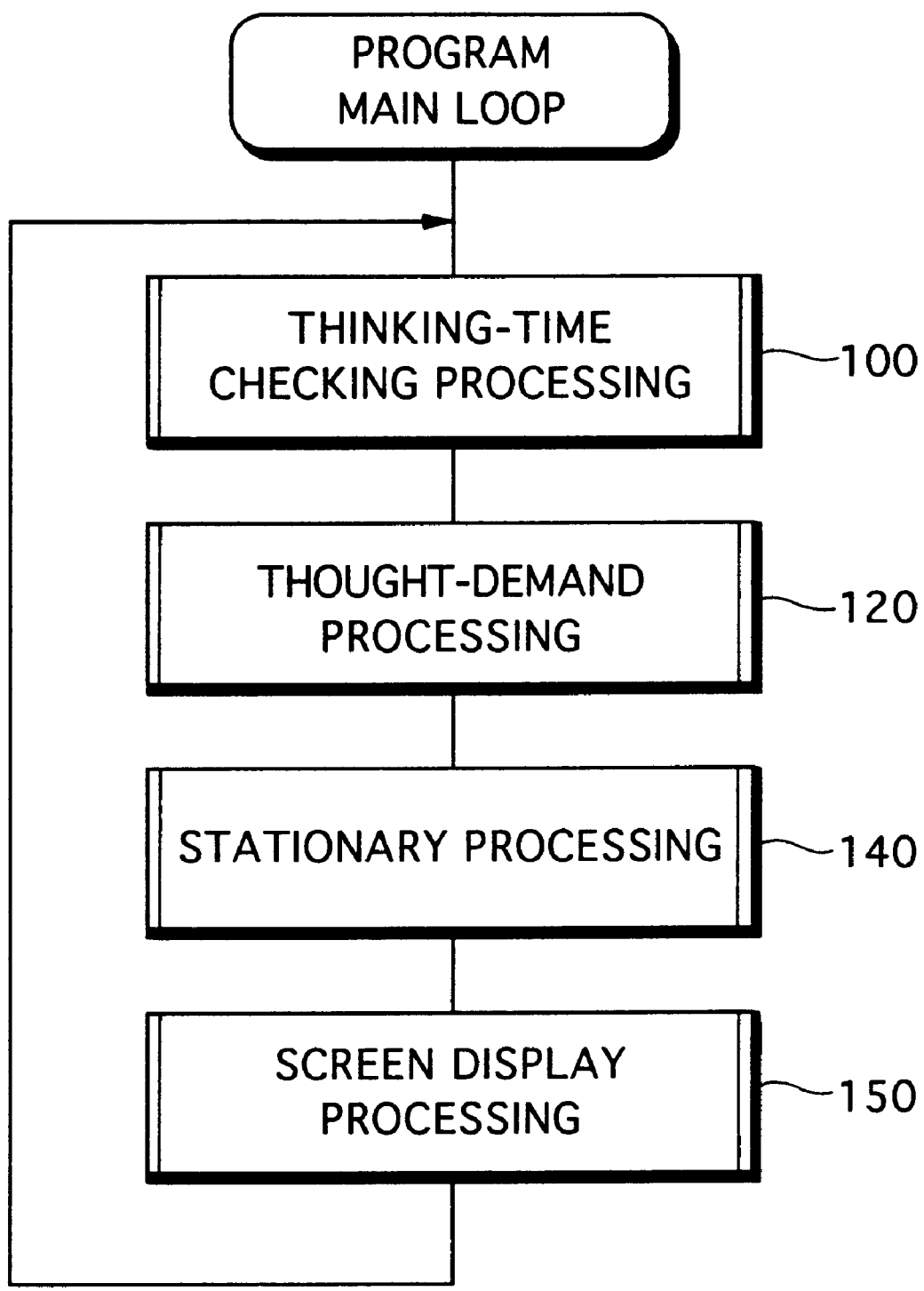
FIG. 5 is a flowchart illustrating the program main loop of a video game.

FIG. 5 is a flowchart illustrating the flow of processing for carrying out control to determine how the programs regarding the plurality of characters are to be run.

The main loop of the system comprises "thinking-time checking processing" (step 100) which determines whether time has arrived for execution of program codes for a plurality of characters processed in parallel, and which assigns an order to a character whose execution time has arrived and registers the result in the queue control block; "thought-demand processing" (step 120) for fetching characters, which have been registered in the queue control block, in order from the beginning of the block, and executing the program codes corresponding to these characters one line at a time (or over several lines if required) (inclusive of interpretation of an "intermediate code", described later); "stationary processing" (step 140) for adjusting (modifying or updating) data concerning a message or character in accordance with the results of processing obtained from the thought-demand processing; and "screen display processing" (step 150) for creating (altering or editing) image data in the video RAM 52 based upon the results of processing obtained from the stationary processing.

In the video game apparatus, one screen of image data generally is created in the vertical scanning interval of the display unit (television receiver or monitor display device) 40 (i.e., every $\frac{1}{60}$ of second according to the NTSC). The main loop mentioned above also is repeatedly executed with the vertical scanning interval serving as one period).

Figure 6:
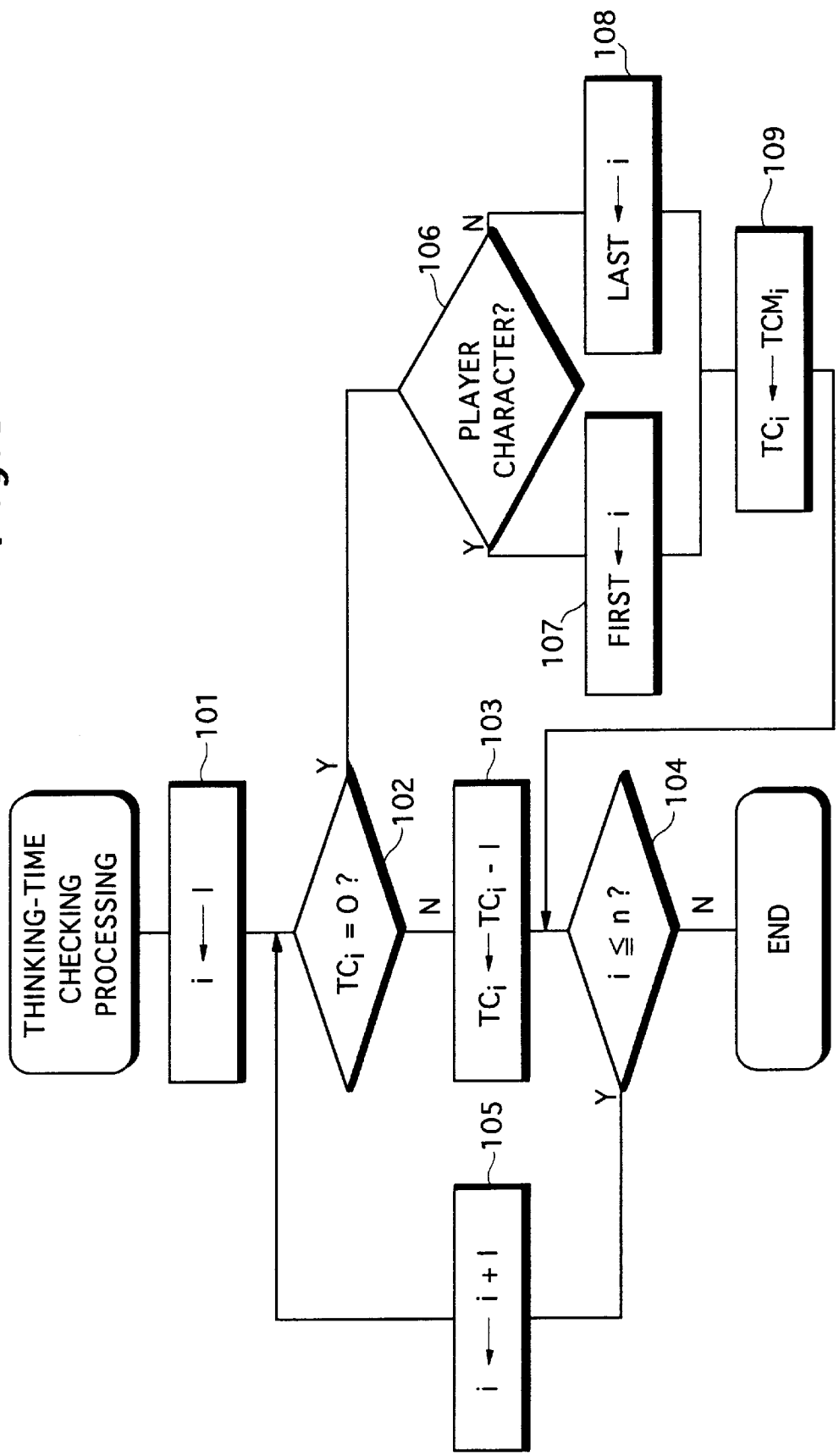
FIG. 6 is a flowchart illustrating the details of thinking-time checking processing.

The thinking-time checking processing (step 110) will be described with reference to FIG. 6.

As mentioned above, default values are set in each of the thinking-time storage areas $TCM_i$ in initialization processing. After the programs regarding the respective characters have been run, the thinking times ("think") described in the programs are set in the thinking-time storage areas $TCM_i$ and these values are transferred to the thinking-time counters $TC_i$.

First, a check is performed to determine, with regard to all characters, when the values in the thinking-time counters $TC_i$ have become zero or not. The character number i set to 1 (step 101) and then it is determined whether the value in the thinking-time counter $TC_i$ designated by i is 0 or not (step 102). In a case where the value in the counter $TC_i$ is 0, processing makes a transition to queue registration processing from step 106 onward.

In a case where the value of the thinking-time counter $TC_i$ is not 0, the value in the counter $TC_i$ is decremented (step 103). The character number i is incremented (step 105) and the content of counter $TC_i$ is checked in similar fashion with regard to the next character. If the checking of all characters is finished (step 104), thinking-time checking processing is terminated.

In order to give the highest priority to the operation of the player character (Character 1), special processing is executed with regard to the player character. In the case of the player character (i=1) (step 106), the player character (i=1) is registered in the storage location "first" at the lead of the queue control block (step 107). Characters already registered in the queue control block have their order in the sequence moved down one by one. In the case of a character other than the player character, the character (number i) is registered in the final storage location "last" of the queue control block (step 108).

Since the value in the thinking-time counter $TC_i$ is 0 with regard to a character registered in the queue, the value that has been stored in the thinking-time storage area $TCM_i$ is set in the counter $TC_i$ (step 109). Thereafter, the character number i is incremented (step 105) and the program returns to step 102.

For example, since the thinking time is 0 (think $00 on Line No. 3 in FIG. 10) in the program of the player character (the hero), the decision $TC_1=0$ is rendered (step 102) in the thinking-time checking processing of each cycle and, hence, the player character is registered in the queue. Moreover, this player character is registered at the head of the queue (step 107). Accordingly, the program of the player character is executed one line (or a plurality of lines) at a time every cycle ($\frac{1}{60}$ of a second) of the main loop.

Since the thinking time is 8 (think $08 on Line No. 4 in FIG. 11) in the program of Character 2 (the frog), the decision $TC_2=0$ is rendered every $\frac{8}{60}$ of a second. In principle, therefore, this program is executed one line (or a plurality of lines) at a time every $\frac{8}{60}$ of a second. (In the thought-demand processing 120 described next, it is also possible that the program will not be executed if the order comes later in the sequence, even if the character has been registered in the queue.)

Thus, the thinking time given for each character represents the rate at which the program of this character is advanced. In the program codes of the respective characters illustrated in FIGS. 10 through 17, the thinking time is conferred once at a location near the head of the program. Depending upon how the story of the game develops, the thinking time of the character changes. That is, it goes without saying that a command (statement) relating to thinking time may be inserted at a plurality of desired locations in the program of a character.

Figure 7:
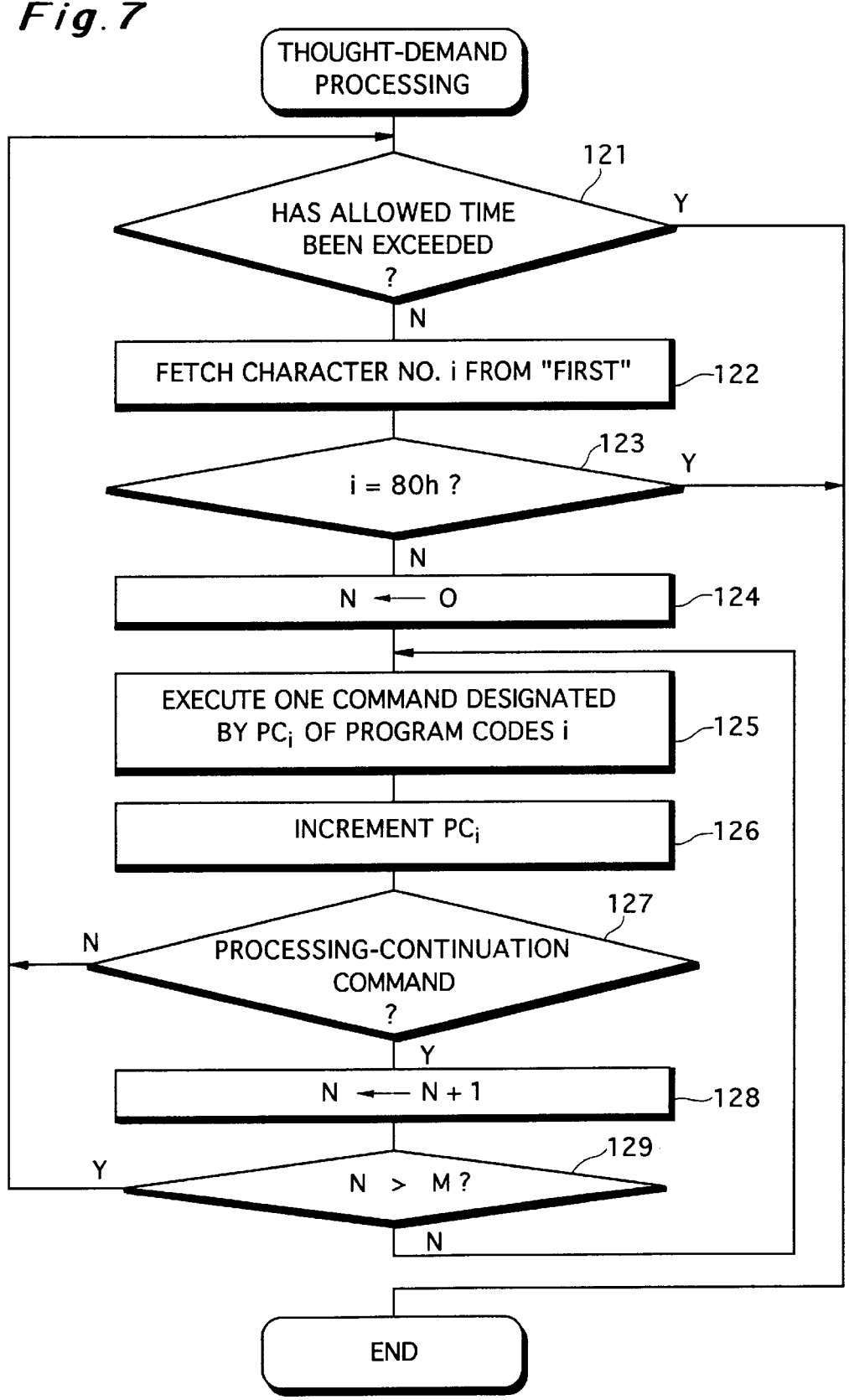
FIG. 7 is a flowchart illustrating the details of thought-demand processing.

FIG. 7 illustrates the details of thought-demand processing (step 120).

First, it is determined whether the time allowed for thought-demand processing has been exceeded (step 121). One cycle of the main loop must be completed in $\frac{1}{60}$ of a second, as mentioned above. If a large amount of time is expended in thought-demand processing, the ensuing stationary processing (step 140) and screen display processing (step 150) will not end in time. Accordingly, if the allowed time has elapsed at step 121, the thought-demand processing is forcibly terminated even if execution of the programs for all of the characters registered in the queue has not ended. Measurement of elapsed time may be performed by reading the positions of the scanning lines on the display screen or by a time-interrupt. Because of the ensuing processing (the stationary processing and screen display processing), the allowed time is set to be shorter than one cycle ($\frac{1}{60}$ of a second) of the main loop.

Next, the character (number i) to be executed first is fetched from the storage location "first" at the beginning of the queue control block (step 122). When the character (number i) is fetched from the storage location "first", the contents of each of the storage locations of the queue control block are moved up one by one. In a case where a character (number i) is not present in the storage location "first (i.e., if, in this embodiment, 80h is present in this location), thought-demand processing is terminated (step 123).

In though-demand processing, the program regarding a single character is, in principle, executed only for one line (one command). There are exceptional cases in which the program commands are executed over a plurality of lines. Such is the case for a command which is a processing-continuation command, described next. However, even if a command is a processing-continuation command, an upper limit is set for the number of commands (number of lines) executed in one cycle of the thought-demand processing. This upper limit is a stipulated number M of commands. A variable N is used to count the number of commands processed.

The number N of processed commands is initialized (step 124). In the program codes corresponding to the fetched character (number i), the line indicated by the program counter $PC_i$ is executed (step 125) and the program counter $PC_i$ is incremented (step 126). By way of example, if the command read out of the program codes is "think $00", then the numerical value 00 is set in the thinking-time storage area $TCM_i$. The program counter $PC_i$ is incremented in conformity with the number of bytes of one line (one command) of the program. For example, since the command "think $00" is composed of two bytes, the counter $PC_i$ is incremented by 2.

It is determined whether one line of an executed program code is a processing-continuation command (step 127). The term "processing-continuation command" refers to a command of the type in which comparatively little time is required for execution of, for example, conditional decision processing (an if statement) or computation processing ("set", in which a numerical value is substituted into a variable, "inc", in which a numerical value is added, or processing which extends over a plurality of lines). This command is such that overall processing is smoothened by continuing processing over a plurality of lines (a plurality of steps). In a case where a command is not a processing-continuation command, the program returns to step 121. Processing is repeated from this step onward. In the case of the processing-continuation command, the number N of processing commands is incremented (step 128).

In order to limit the number of commands to be implemented in one cycle of thought-demand processing with regard to one character, the stipulated number M of command is provided, as mentioned earlier. It is determined whether the number N of processed commands has exceeded the stipulated number M of commands (e.g., five lines) (step 129). If M has not been exceeded, one line of the next program code is executed (step 125). In a case where execution of a program belonging to the processing-continuation command has ended, and in a case where N has exceeded M, execution of the program regarding this character is suspended and the program returns to step 121.

Figure 8:
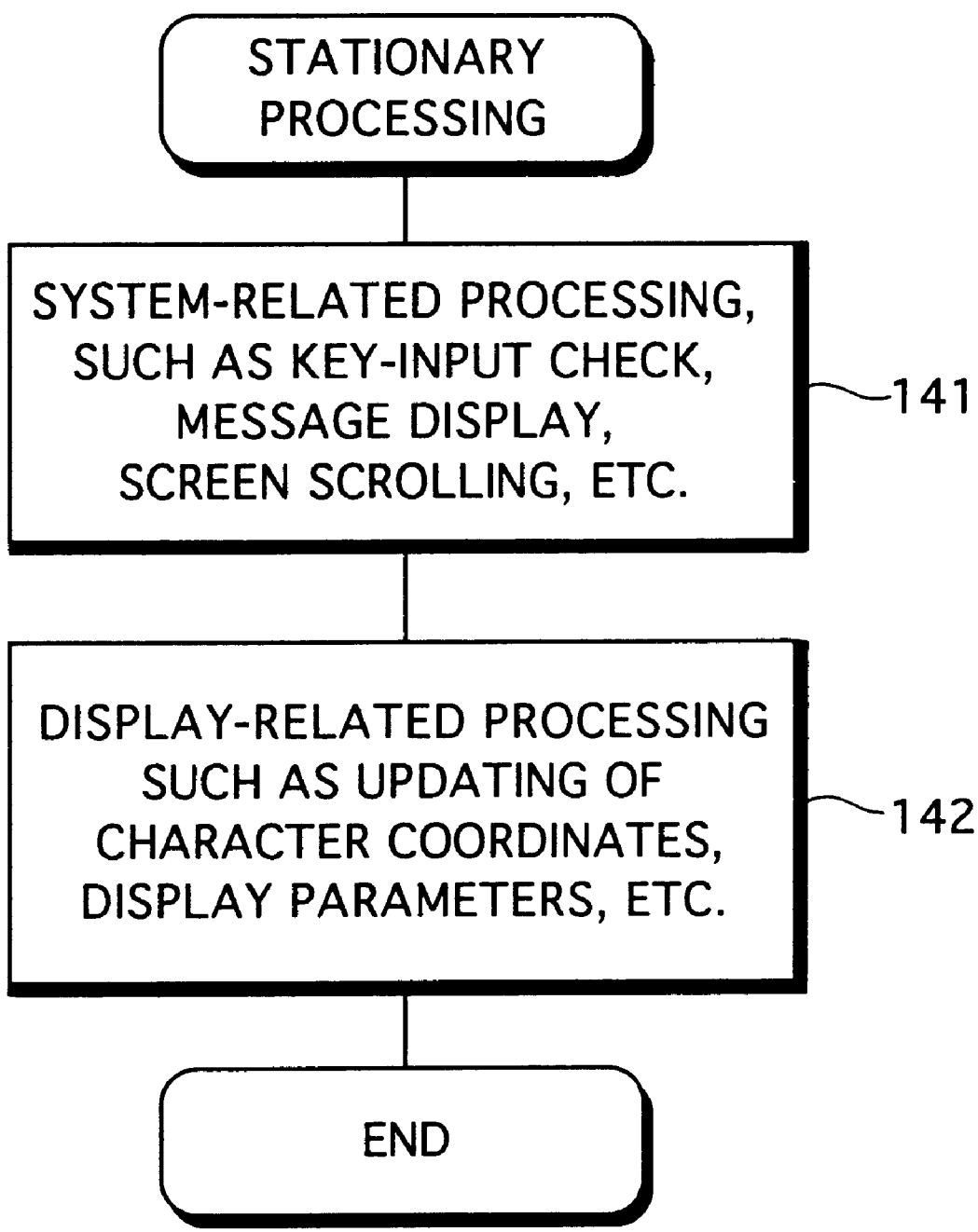
FIG. 8 is a flowchart illustrating the details of stationary processing.

FIG. 8 illustrates the details of stationary processing.

The stationary processing includes processing (step 141) related to the system and processing (step 142) related to the display.

In the system-related processing, processing related to detection of contact between the hero and another character on the display screen, acceptance of key inputs from the controller 20 and processing relating to display of messages of characters, as well as screen scrolling processing, is executed. For each and every character, the RAM 51 is provided with a display parameter area for storing the positional coordinates of the character on a map, the orientation of the character, an animation number (the type of animation), traveling speed, graphic data (image data for displaying a character on one screen) and so on. In the processing related to the display, updating of each of these types of display parameters is carried out.

Figure 9:
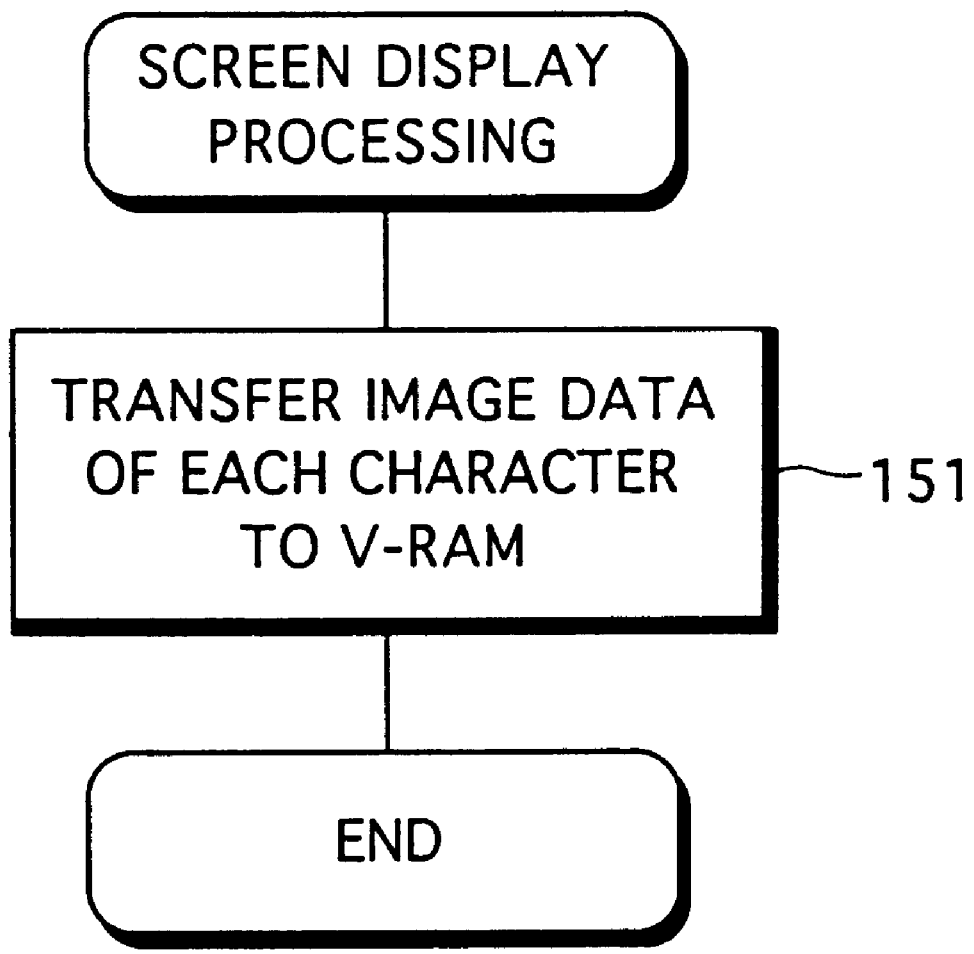
FIG. 9 is a flowchart illustrating the details of screen display processing.

FIG. 9 illustrates the screen display processing. Here image data for displaying each character in accordance with the display parameters updated in stationary processing is transferred to the V-RAM 52 (step 151).

The portion of a game which utilizes this system will be illustrated and the features of the system will be described in detail in conformity with the progress of the game.

In this system, use is made of a verbal (lexical) definition type compiler program for converting program codes (source codes) (illustrated in FIGS. 10 through 17), which have been created with regard to individual characters, into program codes executable by the CPU 50. The verbal definition type compiler program is for speeding up execution of the program eventually created, or for reducing the necessary storage area.

Though a verbal definition type compiler program is not essential in order to construct the system, it becomes possible to create program codes effectively by means of this program.

The verbal definition type compiler program includes a verbal (lexical) definition file for interpreting source codes. Set forth in the verbal definition file are a description of words and phrases, a description of the analytical elements of the words and phrases, and a designation to an output code.

The verbal definition type compiler program constructs an internal dictionary when the verbal definition file is read in. A word or phrase (e.g., "think", "ret", "everpc" in FIG. 10) is looked up by retrieving the dictionary and the parameter is fetched in accordance with the analytical data of the word or phrase (lexical analysis data). Further, an executable program code is outputted in accordance with an output designation.

The verbal definition file is useful in program development in which there are many trial-and-error elements, as in game creation, since it is possible to directly exchange the words and phrases which appear in source codes to the corresponding executable program codes without reconstructing the compiler per se.

FIGS. 10 through 17 illustrate an example of a group of program codes processed in parallel in the game. FIG. 10 shows a Program Code 1 for moving the "hero" (Character 1), FIGS. 11 and 12 show a Program Code 2 for moving "Frog" (Character 2), FIG. 13 shows a Program Code 3 for moving "Maru" (Character 3), FIGS. 14 and 15 show a Program Code 4 for moving "Robo" (Character 4), FIG. 16 shows a Program Code 5 for moving "Eira" (Character 5), FIG. 17 shows a Program Code 6 for moving the "timer" (Character 6), and FIG. 18 shows an example of a message file referred to when these program codes are executed.

FIGS. 19 through 27 show examples of screens displayed during the course of the game.

"Frog" is the name of a frog who is a friend of the hero. "Maru" is the name of Frog's girlfriend. "Robo" the name of a robot, who is a friend of the hero. "Eira" is the name of an acquaintance of Robo. "Timer" is the timer which measures elapsed time, as described earlier.

In principle, a program is composed of one main routine and a plurality of subroutines [though only the main routine is illustrated in the case of Program Code 3 (FIG. 13)]. The portion from the first line of the program code to the initial subroutine (or to the last line of the program code) is the main routine [Line No. 1 to Line No. 5 in the case of Program Code 1 (FIG. 10)]. The initial settings of the character and the usual actions thereof are set forth in the main routine. A subroutine is called by a communication request statement of another program code being processed in parallel.

The subroutine starts from a line having an asterisk (*) provided in front of the subroutine name (label) and ends with a command "ret". [For example, the subroutine in Program Code 1 (FIG. 10) extends from the seventh line to the tenth line.]

The game aims at achieving an objective wherein the player searches for companions with whom to play, and the game is played by moving the hero (Character 1), which is the player character, on a map.

The setting of other characters is as follows: Frog (Character 2) and Maru (Character 3) have promised to have a date. Maru has not yet appeared at the meeting place agreed upon. Robo (Character 4) has made jogging his daily routine in order to diet. Eira (Character 5) is looking for Robo in an attempt to collect a debt.

In initialization processing, default values are set in respective ones of the thinking-time storage areas $TCM_i$ and the same default values are set in the corresponding thinking-time counters $TC_i$. The program counters $PC_i$ and PC-storage areas $SPC_i$ have all been cleared. The minimum value 7 of the request level (order of priority) is set in the request-level storage areas $RL_i$. The queue control block is cleared of its contents.

When the program code "think $00" on the third line in Program Code 1 (the hero) in FIG. 10 is executed, a thinking time 0 is set in the thinking-time storage area $TCM_1$ and then is preset in the thinking-time counter $TC_1$. In the thinking-time checking processing, $TC_1=0$ is judged to hold and queue registration is performed. Since the hero is the player character, this character is registered in the storage location "first" at the head of the queue control block, as described earlier. From this point onward, Program Code 1 is executed one line (or a plurality of lines) at a time every cycle of the main loop (every 1/60 of a second). The initial setting of the hero ends at "ret" on the fourth line.

Ordinary action of the hero is left to manipulation by the player at "everpc" on the fifth line.

Here "everpc" is itself an endless loop, as in the case of "everchase" and "everstay" commands described later. In such a loop the program comes to a standstill and does not advance. Such a command is allowed so that an escape can be made to another routine by a communication request from another program.

By the time the initial setting ends and a transition is made to ordinary action, Line No. 5 of the program code currently being executed will have been stored in the program counter $PC_1$ of the hero. The value 7 (minimum value) which prevails at the time of ordinary action will have been stored in the request-level storage area $RL_1$.

In Program Code 2 (Frog) shown in FIG. 11, "! invited" on the third line indicates a flag "invited", which is raised when Frog is invited by the hero. The flag is declared by providing the exclamation point (!) at the beginning of the line.

At "think $08" on the fourth line, thinking time 8 is set in the thinking-time storage area $TCM_2$ and then is preset in the thinking-time counter $TC_2$. In thinking-time checking processing, the value of the thinking-time counter $TC_2$ is decremented and $TC_2=0$ is established when the main loop is traversed eight times, and Frog is registered in the queue control block.

The type of character to be displayed is designated by "char $01" on the fifth line. Here "char" is a command for designating the type of image data (referred to as graphic data) for displaying the character on the screen. Graphic Nos. $01, $02, $03 and $04 represent Frog, Maru, Robo and Eira, respectively. Along with the execution program, the graphic data is stored beforehand in the ROM 31 built in the memory cartridge 30. The data is read out to the video RAM 52 via the connector 56.

The command "char" is always designated one time before the character makes its appearance on the screen. However, depending upon how the story of the game develops, it is possible that the shape (form) of the character will change (as by undergoing a transformation while the game is in progress). It goes without saying, therefore, the "char" command may be inserted at a plurality of desired locations in the program.

By a code "xy $1a $14" on the sixth line, coordinates ($1a, $14) on a map (provided in memory and corresponding to the display screen) on which Frog initially appears are set in the display parameter area regarding Frog.

The initial setting ends at "ret" on the seventh line.

Next, "animeset $01" on the eighth line indicates that the type of animation is $01. The animation type $01 is set in the display parameter area regarding Frog. The command "animeset" is for designating the type of animation displayed on the screen. Here $00, $01 and $06 represent a rest pattern, a walking pattern and a running pattern, respectively. In general, the walking pattern and the running pattern implement walking and running animations by alternately displaying two types of images (an image in which the right foot is extended and an image in which the left foot is extended).

Designation of $20 as the traveling speed is made by "speed $20" on the ninth line. The traveling speed is set in the display parameter area regarding to Frog. The value $20 indicates a comparatively slow walking speed.

Next, "backhere"~"back" on the 10th to 17th lines indicate that processing based upon the program codes bracketed by these is to be executed repeatedly. Specifically, "backhere" on the 10th line is the beginning of a loop and a return to the 10th line is effected by "back" on the 17th line. The loop "backhere"~"back" is an endless loop. Escape from the endless loop can be achieved by execution of another routine in response to the above-described communication request.

Frog is moved to coordinates ($1e, $14) on the map by "move $1e $14" on the 11th line.

Frog has its orientation changed in the direction of $00 (the left side of the screen) by "turn $00" on the 12th line. In the "turn" command, $00 represents the left side of the screen and $01 represents the right side of the screen. As a result of this command, the displayed character is pointed in the respective directions.

Action of Frog is halted for a fixed period of time (a time represented by $10) by "wait $10" on the 13th line.

Frog is moved to coordinates ($1a, $14) by "move $1a $14" on the 14th line. Frog is pointed in the direction of $01 (the right side of the screen) by "turn $01" on the 15h line. Action of Frog is halted for the fixed period of time $10 by "wait $10" on the 16th line. More specifically, on the 10th to the 17th lines, backand-forth movement is performed between coordinates ($1a, $14) and ($1e, $14). This indicates the manner in which Frog waits Maru and is the ordinary action of Frog.

By the time the initially setting is finished and a transition is made to ordinary action, any of the line numbers 10 to 17 (between "backhere" and "back") of Program Code 2 currently being executed will have been stored in the program counter $PC_2$ of Frog. The value 7 (minimum value) which prevails at the time of ordinary action will have been stored in the request-level storage area $RL_2$.

In Program Code 3 (Maru) shown in FIG. 13, a flag "Maru has arrived", which is raised when Maru has arrived at the place where Frog is waiting, is declared by "! Maru has arrived" on the third line. Thinking time is set to 15 by "think $15" on the fourth line. The type of graphic data of Character 3 (Maru) is designated by "char $02" on the fifth line. The coordinates on the map on which Maru initially appears are set to ($0c, $10) by "xy $0c $10" on the sixth line. The initial setting is ended by "ret" on the seventh line.

Next, "backhere"~"back" on the 8th to 23rd lines is an endless loop. Specifically, "backhere" on the 8th line is the beginning of the loop and a return to the 8th line is effected by "back" on the 23rd line.

A decision based upon the time being measured by the timer (Character 6) is implemented by "if time>1" on the 9th line. The timer (Character 6) increments the counter one time at 60/60=1 second by "think $60" (third line), as will be understood from Program Code 6 in FIG. 17. When the value in the counter reaches 60, time is advanced by 1 (sixth and seventh lines) and the counter is reset to 0 (eighth line). Accordingly, time 1 corresponds to 60 seconds.

Maru does not make an appearance on the screen until time in excess of 1 elapses ("else" on the 20th line and "stay" on the 21st line). At elapse of time 1, Maru appears on the screen to act in accordance with the processing from the 10th to the 19th lines.

By the time the initial setting ends and a transition is made to ordinary action, any of the line numbers 8 to 23 (between "backhere" and "back") of Program Code 3 currently being executed will have been stored in the program counter $PC_3$ of Maru. The value 7 (minimum value) which prevails at the time of ordinary operation will have been stored in the request-level storage area $RL_3$.

In Program Code 4 (Robo) shown in FIG. 14, "! invited" on the third line indicates a flag "invited", which is raised when Robo is invited by the hero. At "think $05" on the fourth line, thinking time 5 is set. The type of displayed character is designated by "char $03" on the fifth line. Coordinates on a map on which Robo initially appears are set to ($14, $18) by "xy $14 $18" on the sixth line.

Next, "animeset $06" on the eighth line indicates that the type of animation is $06, which indicates the pattern for running. A traveling speed of $40 is designated by "speed $40" of the ninth line. The value $40 indicates a comparatively high running speed.

Next, "backhere"~"back" on the 10th to 19th lines is an endless loop. Specifically, "backhere" on the 10th line is the beginning of the loop and a return to the 10th line is effected by "back" on the 19th line. Robo is moved to coordinates ($18, $17) by "move $18 $17" on the 11th line. Action of Robo is halted for a period of time $10 by "wait $10" on the 12th line. Robo is moved to coordinates ($18, $1d) by "move $18 $1d" on the 13th line. Action of Robo is halted for a period of time $10 by "wait $10" on the 14th line. Robo is moved to coordinates ($14, $1e) by "move $14 $1e" on the 15th line. Action of Robo is halted for a period of time $10 by "wait $10" on the 16th line. Robo is moved to coordinates ($14, $19) by "move $14 $19" on the 17th line. Action of Robo is halted for a period of time $10 by "wait $10" on the 18th line. In other words, Robo runs to traverse the four points at coordinates ($18, $17), ($18, $1d), ($14, $1e), ($14, $19) on the 10th to the 19th lines. This indicates the manner in which Robo jogs and is the ordinary action of Robo.

By the time the initial setting ends and a transition is made to ordinary action, any of the line numbers 10 to 19 (between "backhere" and "back") of Program Code 4 currently being executed will have been stored in the program counter $PC_4$ of Robo. The value 7 (minimum value) which prevails at the time of ordinary action will have been stored in the request-level storage area $RL_4$.

In Program Code 5 (Eira) shown in FIG. 16, a flag "Eira has arrived", which is raised when Eira has arrived at the location of Robo, is declared by "! Eira has arrived" on the third line. Thinking time is set to 10 by "think $10" on the fourth line. The type of graphic data of Character 5 (Eira) is designated by "char $04" on the fifth line. The coordinates on the map on which Eira initially appears are set to ($26, $1a) by "xy $26 $1a" on the sixth line. The initial setting is ended by "ret" on the seventh line.

Next, "backhere"~"back" on the 8th to 24th lines is an endless loop. Specifically, "backhere" on the 8th line is the beginning of the loop and a return to the 8th line is effected by "back" on the 24th line. A decision based upon time is implemented by "if time>3" on the 9th line. Eira does not make an appearance on the screen until time in excess of 3 elapses ("else" on the 21st line and "stay" on the 22nd line).

At elapse of time 3, Eira appears on the screen and the processing from the 10th to the 20th lines is executed.

By the time the initially setting is finished and a transition is made to ordinary action, any of the line numbers 8 to 24 (between "backhere" and "back") of Program Code 5 currently being executed will have been stored in the program counter $PC_5$ of Eira. The value 7 (minimum value) which prevails at the time of ordinary action will have been stored in the request-level storage area $RL_5$.

The initial settings are ended by the foregoing and all of the characters begin their ordinary (default) action.

The three names of Hero, Frog and Robo are displayed on the initial screen of the game. The hero, namely the player character, moves on the map and converses with the other characters, thereby advancing the game. The display screen is scrolled up or down, left or right by movement of the player character, whereby an area of the map not currently being displayed is brought into view.

Figure 28:
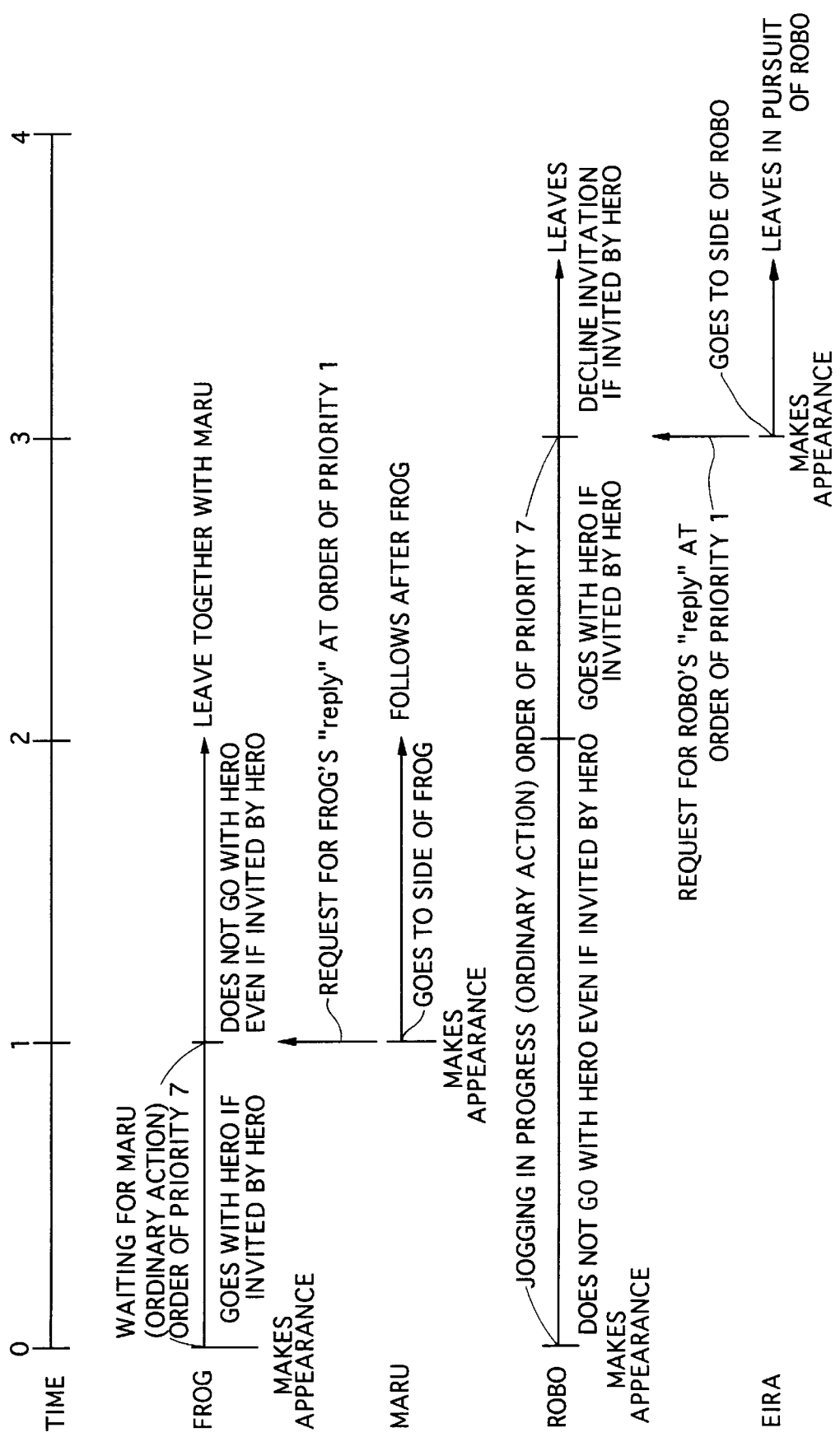
FIG. 28 illustrates the flow of the game when the hero does not move.

In order to describe motion of characters other than that of the player character (the hero), description will be rendered with reference to FIG. 28 while it is assumed for the sake of simplicity that the player is not applying any acting instruction to the hero, namely that the hero is not being moved. In the programs for Maru and Eira, conditional branching based upon the time measured by the timer is performed in ordinary action, as mentioned above. Accordingly, the story proceeds even if the hero is not acting.

Since the player is not applying any acting instruction to the hero, the hero is at rest or stalled at the initially displayed position (coordinates) (generally at the center of the screen). While moving back and forth between coordinates ($1a, $14) and ($1e, $14), Frog performs the ordinary action of waiting for Maru. Robo is performing the ordinary action of jogging among the four points at coordinates ($18, $17), ($18, $1d), ($14, $1e), ($14, $19).

At elapse of time 1 (60 seconds), Maru arrives at the place ($1a, $14) where Frog is waiting.

As shown in Program Code 3 (Maru) in FIG. 13, the type of animation is designated to be $06 (the running pattern) by "animeset $06" on the 10th line. The traveling speed is designated to be $40 (the running speed) by umspeed $40" on the 11th line. Maru is moved to the coordinates ($1a, $14) of the location at which Frog is waiting by "move $1a $14" on the 12th line. The type of animation is designated to be $00 (the stationary pattern) by "animeset $00" on the 13th line.

The flag "Maru has arrived" is raised by "set Maru has arrived $01" on the 14th line (i.e., $01 is set as the flag "Maru has arrived"). A message "Sorry to be late. You've been waiting a long time, haven't you?" is read out of the message file (FIG. 18) by "mes matta" on the 15th line, and this message is displayed in a window. A communication request for execution of the routine "*reply" on the 34th line is made to Program Code 2 at order of priority 1 by "req 1 Frog reply" on the 16th line. The type of animation is again designated to be $06 (the running pattern) by "animeset $06" on the 18th line. Maru goes along with Frog in accordance with "everchase Frog" on the 19th line.

As mentioned earlier, "everchase" is itself an endless loop, wherein the program comes to rest without advancing. Accordingly, as long as there is no communication request from another program, Maru will follow after Frog endlessly until the game ends.

As shown in Program Code 2 in FIG. 12, Frog is faced toward Maru by "tura Maru" on the 35th line. Heretofore, an instruction for changing orientation to a desired direction or for effecting movement has been given by an absolute index (orientation and number of dots to be moved). With the present system, however, a situation can arise in which the orientation or coordinates of a character cannot be specified, depending upon how the game develops. Therefore, a more relativistic description such as "change orientation with respect to Maru (tura Maru)" or "move to side of the hero (mova Hero)" is used.

A message "I haven't been waiting long at all." is displayed by "mes zenzen" on the 36th line. The type of animation is designated to be $06 (the running pattern) by "animeset $06" on the 37th line. The traveling speed is designated to be $40 (the running speed) by "mspeed $40" on the 38th line.

It is determined whether the flag "invited" has been raised by "if invited=$01" on the 39th line. Since Frog has not been invited by the hero, the program jumps to the 44th line and Frog is moved to the edge of the map by "move $00 $00". Frog leaves the map, i.e., leaves on the date with Maru following along, in accordance with "everstay" on the 45th line.

At elapse of time 3 (180 seconds), Eira makes an appearance at the coordinates ($26, $1a) and begins to chase after Robo.

As shown in Program Code 5 (Eira) in FIG. 16, the type of animation is designated to be $06 (the running pattern) by "animeset $06" on the 10th line. The traveling speed is designated to be $40 (the running speed) by "mspeed $40" on the 11th line. Eira is moved to the side of Robo by "mova Robo" on the 12th line. The type of animation is designated to be $00 (the stationary pattern) by "animeset $00" on the 13th line.

The flag "Eira has arrived" is raised by "set Eira has arrived $01" on the 14th line. A message "You still haven't paid back the money I lent you!!" is displayed by "mes omaeha" on the 15th line. A communication request for execution of the routine "* reply" on the 35th line is made to Program Code 4 at order of priority 1 by "req 1 Robo reply" on the 16th line. The type of animation is again designated to be $06 (the running pattern) by "animeset $06" on the 18th line. The traveling speed is designated to be $38 by "mspeed $38" on the 19th line. Eira chases after Robo in accordance with "everchase Robo" on the 20th line.

As shown in Program Code 4 in FIG. 15, Robo is faced toward Eira by "tura Eira" on the 36th line. A message "Oh! I'm sorry." is displayed by "mes gomen_3 on the 37th line. The type of animation is designated to be $06 (the running pattern) by "animeset $06" on the 38th line. The traveling speed is designated to be $40 (the running speed) by "mspeed $40" on the 39th line.

It is determined whether the flag "invited" has been raised by "if invited=$01" on the 40th line. Since Robo, like Frog, has not been invited by the hero, the program jumps to the 45th line and Robo is moved to the edge of the map by "move $00 $00". Robo leaves the map while being pursued by Eira in accordance with "everstay" on the 46th line.

Thus, it will be appreciated that the circumstances surrounding the hero prior to elapse of time 1 (when Frog and Robo are on the screen), after elapse of time 1 but before elapse of time 3 (during which Frog leaves the screen and Robo is on the screen) and after elapse of time 3 (when no character is present on the screen) differ greatly from one another. Further, before elapse of time 2, Robo, even if invited by the hero, refuses the invitation because he is jogging, but accepts the invitation if invited after elapse of time 2 (FIG. 14, Program Code 4, lines 22~28). Accordingly, subsequent development of the game differs greatly depending upon how the hero acts (how the player manipulates the controller 20) in the four time intervals, namely before elapse of time 1, after elapse of time 1 but before elapse of time 2, after elapse of time 2 but before elapse of time 3 and after elapse of time 3.

Next, the manner in which the game develops in a case where the hero has acted in some way (i.e., in a case where the player has manipulated the controller) will be described with reference to FIGS. 19 to 27.

Figure 19:
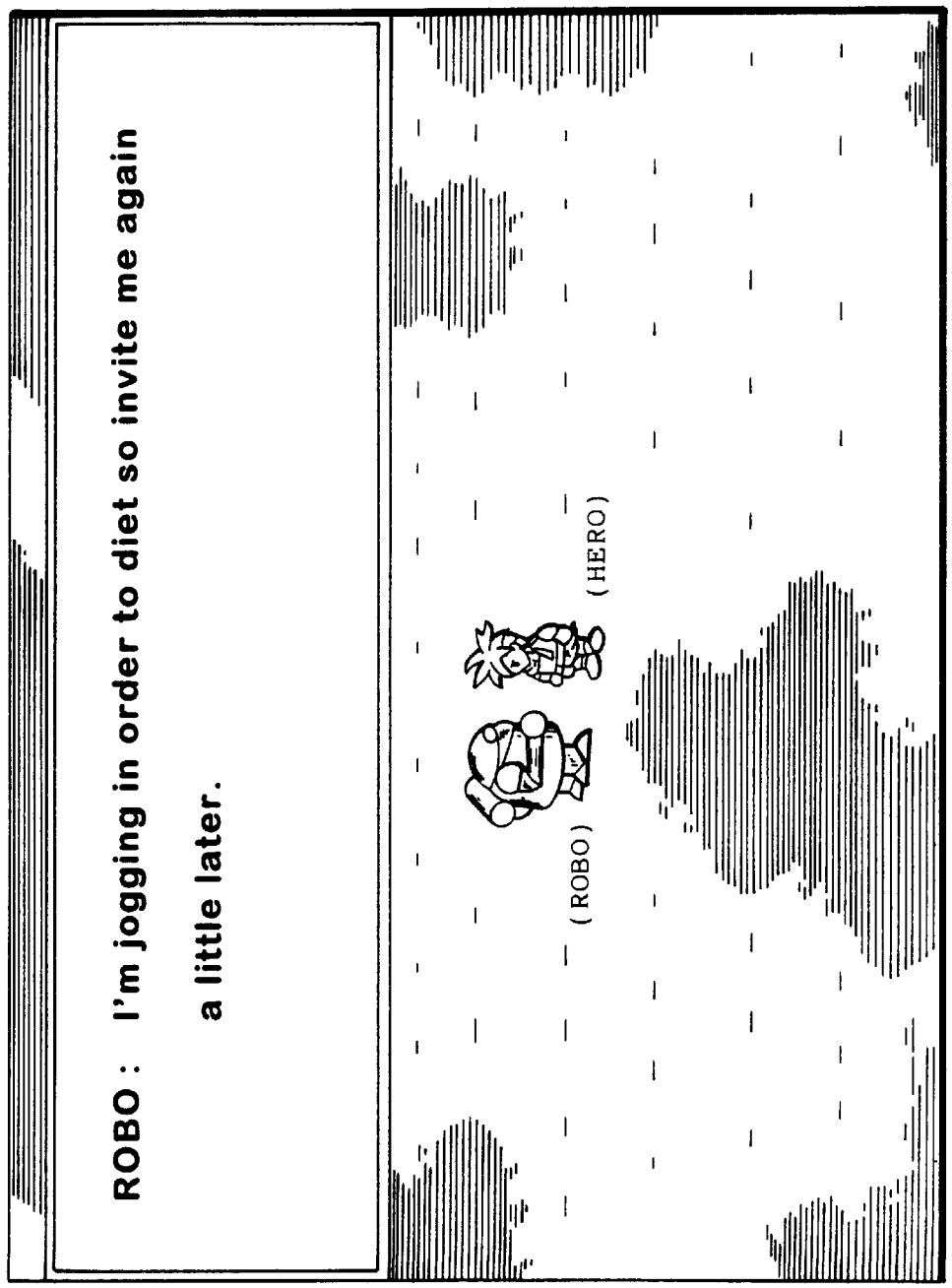
FIGS. 19 through 27 show examples of display screens.

FIG. 19 is an example of a screen on which the hero is conversing with Robo. (In the ordinary state, the hero, Frog and Robo are present on the map, as mentioned above, and a portion of the map is displayed. Therefore, only the hero and Robo are displayed on the screen.)

In a case where it is desired to perform an action through which the hero will talk to Robo, the player uses the joy pad 27 to move the hero to the location (coordinates) at which Robo is displayed and the presses the A button 21. A communication request for execution of the routine "*TALK" on the 21st line is issued from Program Code 1 ("from everpc") to Program Code 4 at order of priority 1. When the fact that the coordinates of the hero and the coordinates of Robo have come into coincidence and the fact that the A button has been pressed are detected, the processing described below is executed in accordance with the control program. The communication request level based upon detection of contact between the hero and another character and detection of an input from the A button 21 is 1 at all times.

When there is a communication request, the order of priority of the routine currently being executed (namely level 7, which has been stored in the request-level storage are $RL_4$) and the order of priority (level 1) of the communication request are compared.

Since the order of priority of the communication request is higher than that of the routine currently being executed, the requested routine "*TALK" is executed preferentially. The line number of the routine that was being executed (any one of the values 10~19 of the program counter $PC_4$) is saved at the storage location of order of priority 7 of this routine in the PC storage area $SPC_4$. The line number 21 at the beginning of the requested routine is set in the program counter $PC_4$ and the order of priority (level 1) of the communication request is stored in the request-level storage area $RL_4$. When processing of the requested routine ends (when the program advances to "ret" on line 33 in FIG. 15), the value (line number) of the program counter saved in the PC storage area $SPC_4$ is set in the program counter $PC_4$ and the order of priority 7 of the storage location at which this value of the program counter was saved is set in the request-level storage area $RL_4$. As a result, when there is a communication request having a high order of priority, the processing that was being executed is suspended in response, the requested routine is executed (line 21 in FIG. 14 to line 33 in FIG. 15) and then the original processing is restored.

When the hero speaks to Robo (line 29) before time 2 elapses in the requested routine (line 21 in FIG. 14 to line 33 in FIG. 15), Robo faces the hero (line 30), the message "I'm jogging in order to diet so invite me again a little later." is displayed in the window (line 31) and Robo declines the invitation (see FIG. 19). The message displayed in the window is read out of the message file by execution of the "mes" command (see FIG. 18).

When the message is displayed in the window, the system makes a transition to a state in which it waits for an input from the A button 21 for the purpose of acknowledging the fact that the message has been read (or for the purpose of turning the page if the message is a long one). In the prior art, the actions of all characters are controlled by a single game program and therefore an input other than that from the A button 21 is not accepted. With the present system, however, each character has its own independent program codes. Consequently, the player is capable of moving the hero freely by the joy pad 27 even while the message is being displayed. For example, it is possible to offer an invitation to Frog (by bringing the hero into contact with Frog and then pressing the A button 21), which is the other character appearing on the screen, without listening to the end of Robo's conversation. In this case it is possible to display both Robo's message window and Frog's message window on the display screen simultaneously. (Generally speaking, though, Robo's message would be cleared and then Frog's message would be displayed.)

Figure 20:
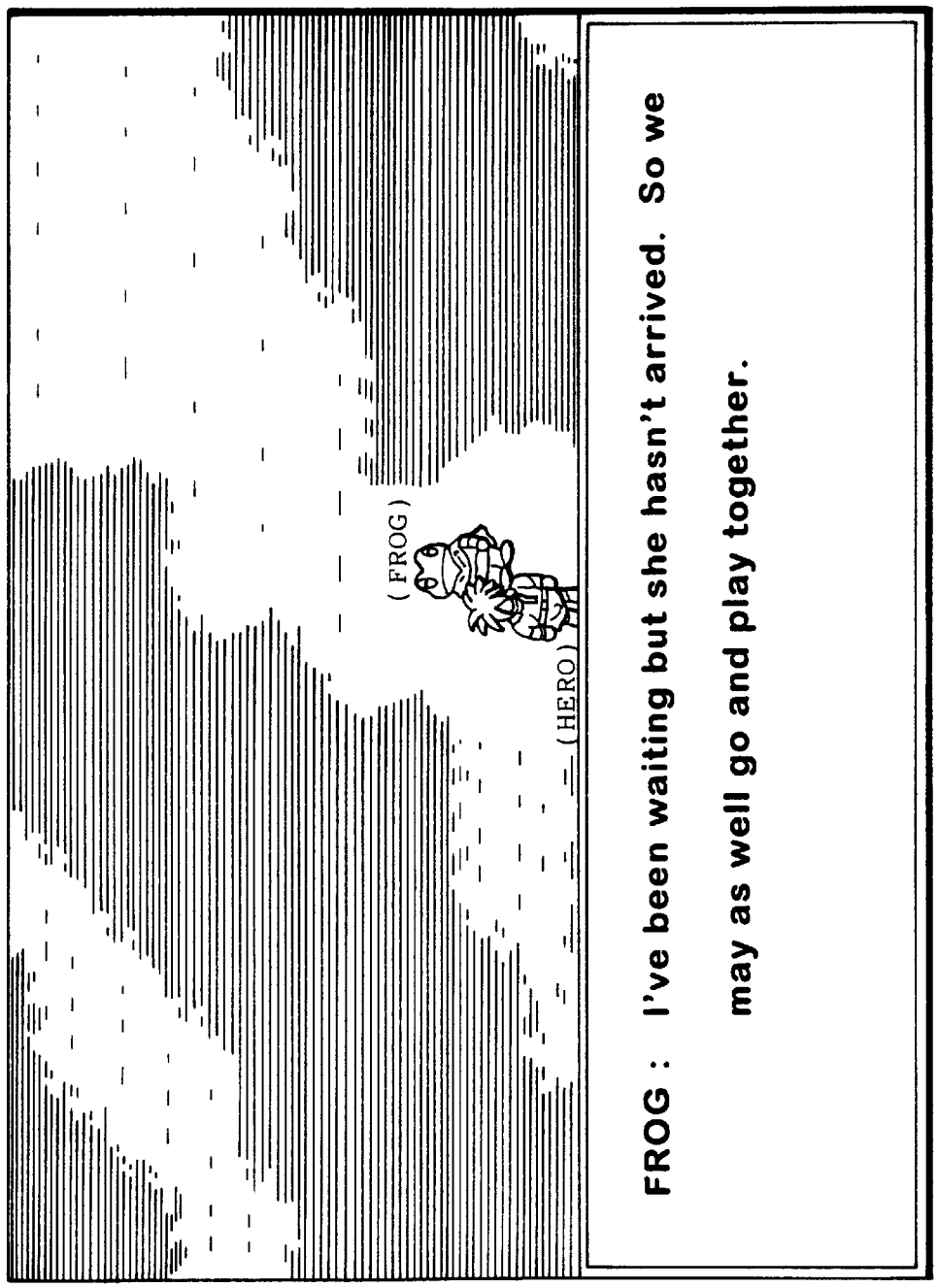

If the hero invites Frog, Frog accepts the invitation if Maru has not yet arrived (FIG. 20). More specifically, when the hero is made to speak to Frog (by bringing the hero into contact with Frog and pressing the A button 21), a request for execution of "*TALK" in Program Code 2 (line 19 in FIG. 11) is made at order of priority 1. If Maru still has not arrived (line 20), the "invited" flag of Frog is raised (line 24) and the attribute possessed by the hero is incremented (line 25). This attribute is incremented whenever the hero's companions increase by one person. Next, on the 26th line in Program Code 2, request for execution of "*Frog companion" in Program Code 1 (line 7 in FIG. 10) is made at order of priority 1. Finally, on the eighth line of Program Code 1, request for execution of "*identical action" in Program Code 2 (line 48 in FIG. 12) is made at order of priority 5 and Frog follows after the hero.

Figure 21:
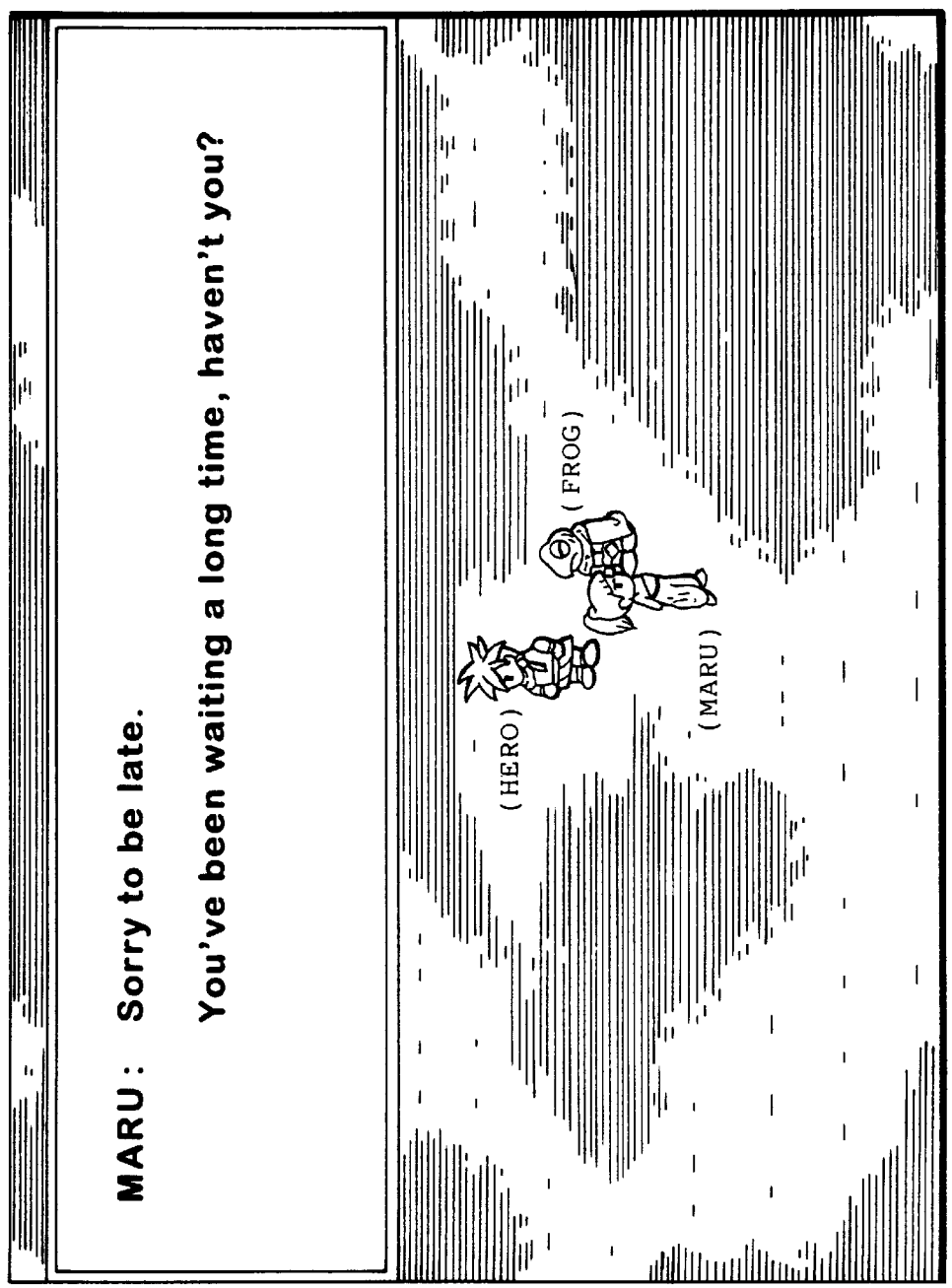
Figure 22:
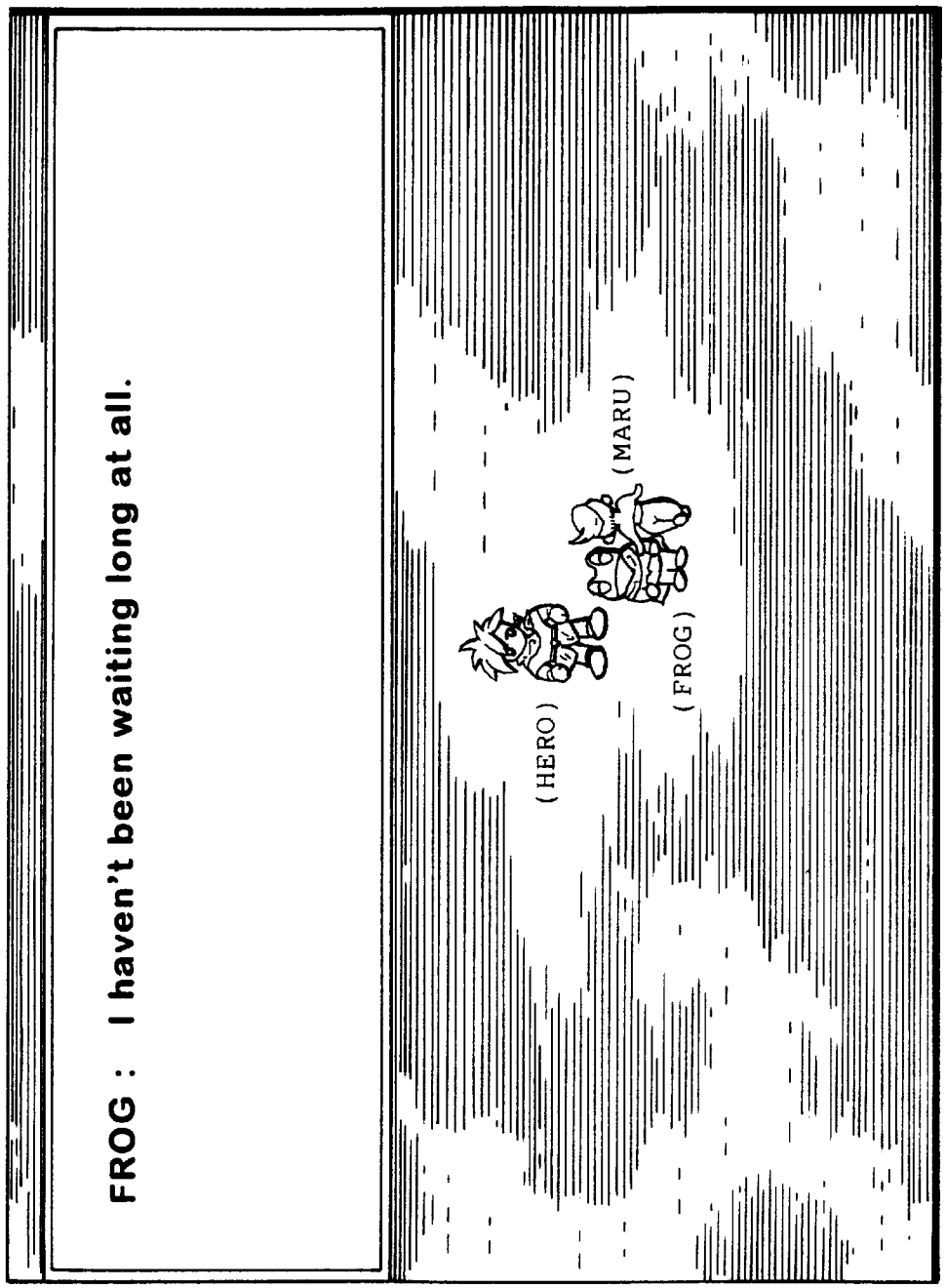
Figure 23:
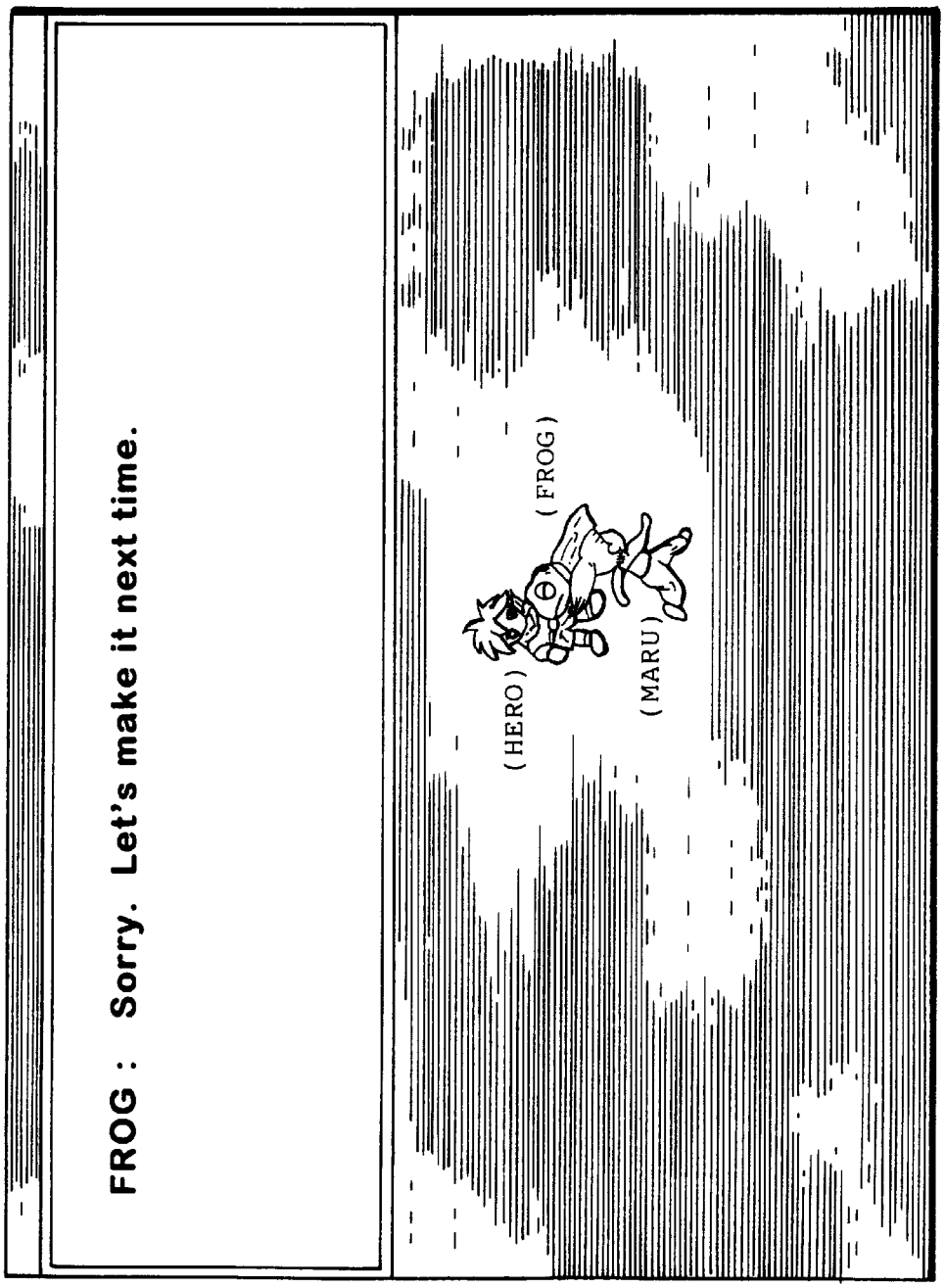

If time 1 elapses (line 9 in FIG. 13) without the hero going to another place along with the already invited Frog (e.g., without the hero leaving with Frog), or if time 1 elapses while the hero is waiting for Robo to finish jogging without the hero inviting Frog, then Frog's friend Maru makes an appearance (FIG. 21).

Maru issues a communication request "req 1 Frog reply" of order of priority 1 to Frog (line 16, FIG. 13). In response, the program of Frog jumps to line 34 (FIG. 12). A message (FIG. 22) is displayed (line 36). In a case where Frog has already been invited by the hero, Frog displays the message "Sorry. Let's make it next time." to decline the invitation (FIG. 23; FIG. 12, lines 39~41). Since the hero has lost one companion, its attribute is decremented (FIG. 12, line 42). In a case where Frog has not been invited by the hero, Frog goes out on a date together with Maru (they leave the map) (FIG. 12, lines 43~46).

Figure 24:
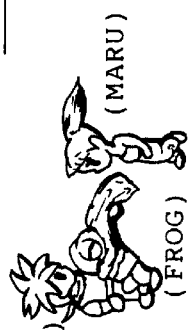

If Maru is already present (FIG. 11, line 28) when the hero invites Frog, Frog declines the invitation because a date has already been promised (FIG. 24; FIG. 11, line 30).

Figure 25:
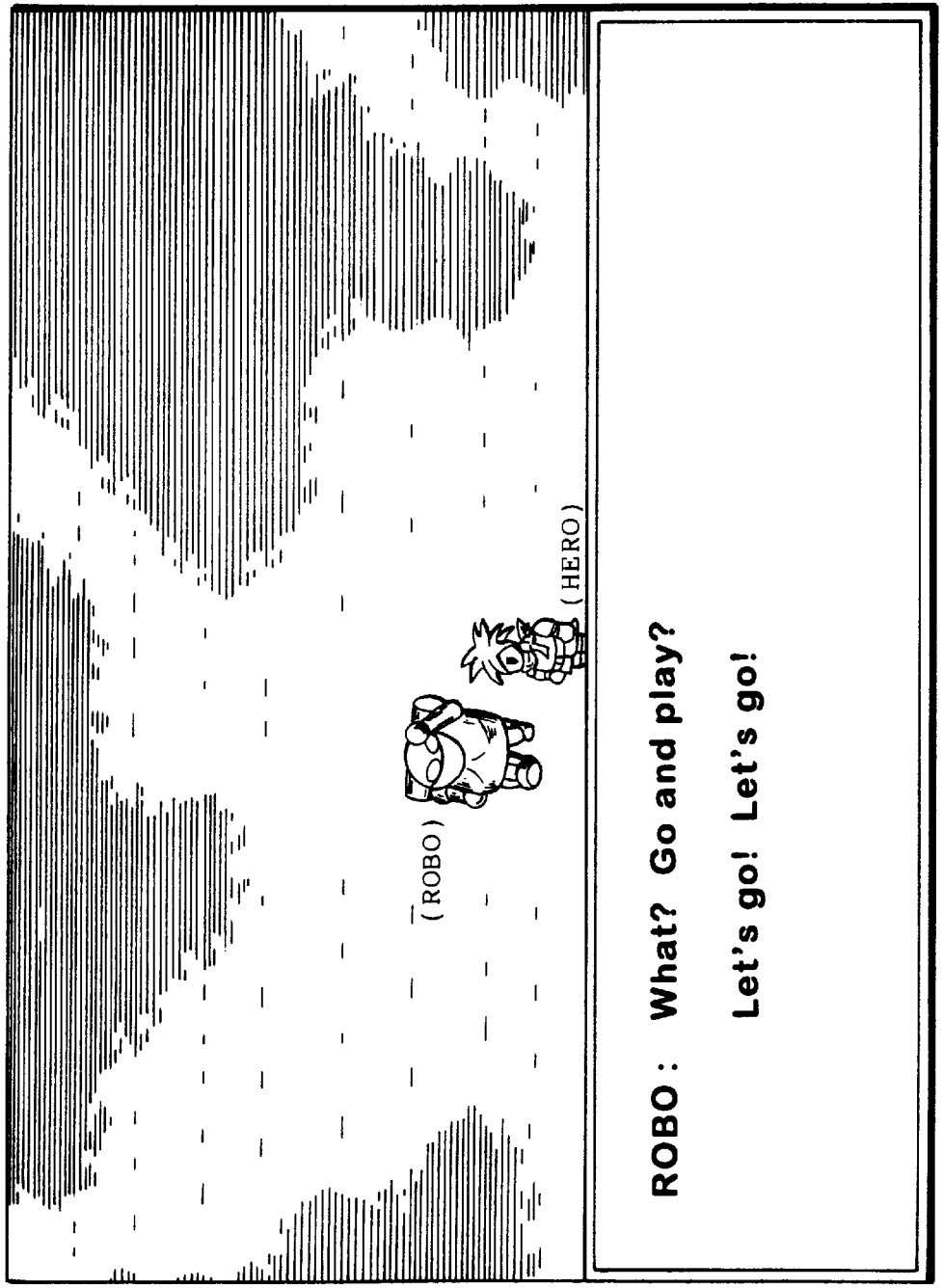

When the hero speaks to Robo (FIG. 14, line 22) at the moment time 2 elapses (with Frog not performing any action, or after Frog and Maru have left together), Robo accepts the invitation (FIG. 25; FIG. 14, line 24) and the hero's attribute is incremented (line 26). Here also communication (order of priority 1) between the hero and Robo is carried out (FIG. 14, line 27; FIG. 10, lines 12~15).

When the hero speaks to Robo, request for execution of "*TALK" in Program Code 4 (FIG. 14, line 21) is made at order of priority 1. Since time 2 has elapsed, the "invited" flag of Robo is raised (line 25) and the attribute possessed by the hero is incremented (line 26). Next, on the 27th line in Program Code 4, a communication request for execution of "*Robo companion" (FIG. 10, line 12) in Program Code 1 is made at order of priority 1. Finally, on the 13th line in Program Code 1, a communication request for execution of "*identical action" (FIG. 15, line 49) in Program Code 4 is made at order of priority 5, and Robo follows after the hero.

Figure 26:
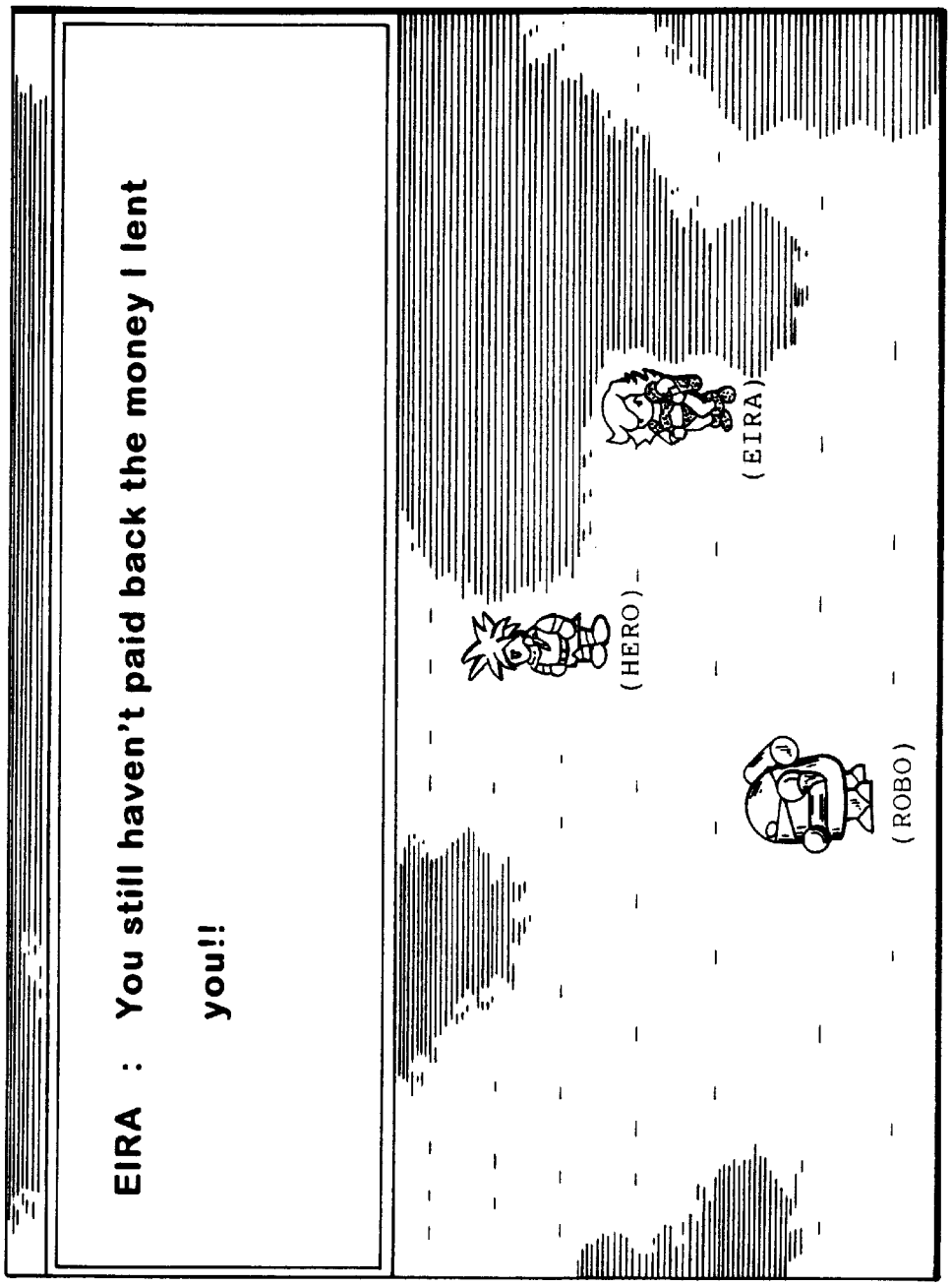

If time 3 elapses without the hero going to another location with Robo (FIG. 16, line 9), Eira, who is looking for Robo in order to have the loan repaid, makes an appearance (Robo is found by Eira) (FIG. 26).

Figure 27:
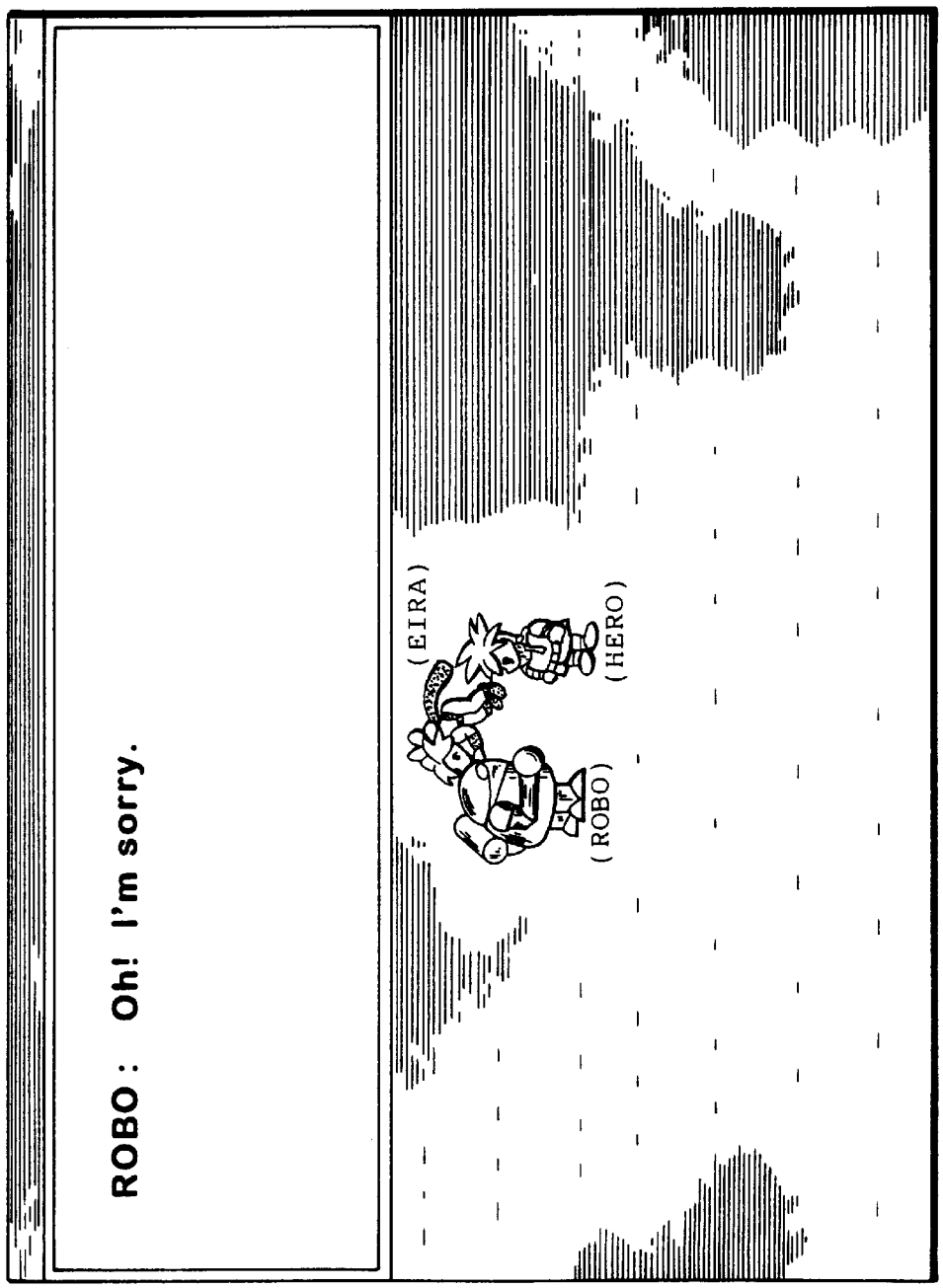

Eira issues a communication request "req 1 Robo reply" to Robo at order of priority 1 (FIG. 16, line 16). In response, the program of Robo jumps to line 35 (FIG. 15). A message is displayed (FIG. 27; line 37). In a case where Robo has already been invited by the hero, the hero's attribute is decremented (FIG. 15, line 43). In a case where Robo has not been invited by the hero, Robo leaves the map while being pursued by Eira (FIG. 15, lines 44~47).

Thus, in the system of the present invention, the characters are made to behave by independent program codes at all times. As a result, depending upon where the hero intervenes in the actions of the other characters, the values of the attributes change in real time and so does the outcome of the game.

As many apparently widely different embodiments of the present invention can be made without departing from the spirit and scope thereof, it is to be understood that the invention is not limited to the specific embodiments thereof except as defined in the appended claims.

What is claimed is:

1. A game apparatus comprising:

procedure information storage means for storing procedure information describing operation processing procedures of objects, the procedure information being mutually independently prepared for each of a plurality of objects including an operation processing of a character which is displayed on a display screen;

procedure position storing means for storing procedure positions to be executed for each item of the procedure information stored in said procedure information storage means;

execution means for reading the procedure information out of said procedure information storage means on the basis of the procedure position of the procedure information stored in said procedure position storing means, and for executing the operation processing in accordance with the procedure information; and procedure position renewal means for renewing the procedure position stored in said procedure position storing means upon execution of the operation processing by said execution means;

wherein the procedure information relating to one object includes a processing request to another object, said apparatus further comprising:

procedure position changing means for changing the procedure position of the procedure information relating to said other object stored in said procedure position storing means, and in response, the processing request is read out of the procedure information relating to said one object by said execution means.

2. A game apparatus comprising:

procedure and speed information storage means for storing procedure information describing operation processing procedures and speed information describing processing execution speeds, the procedure information and speed information being mutually independent for each of a plurality of objects including an operation processing of a character which is displayed on a display screen;

procedure position storing means for storing procedure positions to be executed for each item of the procedure information stored in said procedure and speed information storage means;

execution means for reading the procedure information out of said procedure and speed information storage means on the basis of the procedure position of the procedure information stored in said procedure position storing means, and for executing the operation processing in accordance with the procedure information at the rate based on the speed information stored in said procedure and speed information storage means; and procedure position renewal means for renewing the procedure position stored in said procedure position storing means upon execution of the operation processing by said execution means;

wherein the procedure information relating to one object includes a processing request to another object, said apparatus further comprising:

procedure position changing means for changing the procedure position to be executed of the procedure information relating to said other object stored in said procedure position storing means, and in response, the processing request is read out of the procedure information relating to said one object by said execution means.

3. The game apparatus according to claim 1, wherein the processing request included in the procedure information includes priority information indicating order of priority, and said execution means makes a comparison between the order of priority of the processing being executed at present time and the order of priority of the processing request, and executes the processing having a higher priority.

4. The game apparatus according to claim 2, wherein the processing request included in the procedure information includes priority information indicating order of priority, and said execution means makes a comparison between the order of priority of the processing being executed at present time and the order of priority of the processing request, and executes the processing having a higher priority.

5. A game method comprising the steps of:

(a) storing procedure information describing operation processing procedures of objects, the procedure information being mutually independently prepared for each of a plurality of objects including an operation processing of a character which is displayed on a display screen;

(b) storing procedure positions to be executed for each item of the procedure information stored in step (a);

(c) reading the procedure information stored in step (a) on the basis of the procedure positions stored in step (b);

(d) executing the operation processing procedures in accordance with the procedure information read in step (c); and (e) renewing the procedure positions stored in step (b) upon execution of the operation processing in step (d);

wherein the procedure information stored in step (a) relating to one object includes a processing request to another object;

step (b) further comprises changing the procedure position of the procedure information relating to said another object; and, in response thereto;

step (d) further comprises reading the processing request out of the procedure information relating to said one object.

6. A game method comprising the steps of:

(a) storing procedure information describing operation processing procedures and speed information describing processing execution speeds, the procedure information and speed information being mutually independent for each of a plurality of objects including an operation processing of a character which is displayed on a display screen;

(b) storing procedure positions to be executed for each item of the procedure information stored in step (a);

(c) reading the procedure information stored in step (a) on the basis of the procedure positions stored in step (b);

(d) executing the operation processing procedures in accordance with the procedure information read in step (c) at a rate based on the speed information contained therein; and (e) renewing the procedure positions stored in step (b) upon execution of the operation processing procedures in step (d);

wherein the procedure information stored in step (a) relating to one object includes a processing request to another object;

step (b) further comprises changing the procedure position to be executed of the procedure information relating to said another object; and in response thereto;

step (d) further comprises reading the processing request out of the procedure information relating to said one object.

7. A game method as recited in claim 5, wherein said processing request includes priority information indicating order of priority; and wherein step (d) comprises:

(f) comparing a current order of priority of processing with the order of priority in said processing request; and (g) executing the higher order of priority obtained in step (f).

8. A game method as recited in claim 6, wherein said processing request includes priority information indicating order of priority; and wherein step (d) comprises:

(f) comparing a current order of priority of processing with the order of priority in said processing request; and (g) executing the higher order of priority obtained in step (f).

9. A computer control device comprising a storage medium, said storage medium comprising instructions for performing the steps of:

(a) storing procedure information describing operation processing procedures of objects, the procedure information being mutually independently prepared for each of a plurality of objects including an operation processing of a character which is displayed on a display screen;

(b) storing procedure positions to be executed for each item of the procedure information stored in step (a);

(c) reading the procedure information stored in step (a) on the basis of the procedure positions stored in step (b);

(d) executing the operation processing procedures in accordance with the procedure information read in step (c); and (e) renewing the procedure positions stored in step (b) upon execution of the operation processing in step (d);

wherein the procedure information stored in step (a) relating to one object includes a processing request to another object;

step (b) further comprises changing the procedure position of the procedure information relating to said another object; and, in response thereto;

step (d) further comprises reading the processing request out of the procedure information relating to said one object.

10. A computer control device comprising a storage medium, said storage medium comprising instructions for performing the steps of:

(a) storing procedure information describing operation processing procedures and speed information describing processing execution speeds, the procedure information and speed information being mutually independent for each of a plurality of objects including an operation processing of a character which is displayed on a display screen;

(b) storing procedure positions to be executed for each item of the procedure information stored in step (a);

(c) reading the procedure information stored in step (a) on the basis of the procedure positions stored in step (b);

(d) executing the operation processing procedures in accordance with the procedure information read in step (c) at a rate based on the speed information contained therein; and (e) renewing the procedure positions stored in step (b) upon execution of the operation processing procedures in step (d);

wherein the procedure information stored in step (a) relating to one object includes a processing request to another object;

step (b) further comprises changing the procedure position to be executed of the procedure information relating to said another object; and in response thereto;

step (d) further comprises reading the processing request out of the procedure information relating to said one object.

11. A device as recited in claim 9, wherein said processing request includes priority information indicating order of priority; and wherein step (d) comprises:

(f) comparing a current order of priority of processing with the order of priority in said processing request; and (g) executing the higher order of priority obtained in step (f).

12. A device as recited in claim 10, wherein said processing request includes priority information indicating order of priority; and wherein step (d) comprises:

(f) comparing a current order of priority of processing with the order of priority in said processing request; and (g) executing the higher order of priority obtained in step (f).

\* \* \* \* \*